US011572204B2

United States Patent
Colombat

(10) Patent No.: US 11,572,204 B2
(45) Date of Patent: Feb. 7, 2023

(54) RECONFIGURABLE DEVICE FOR DISPENSING/DISTRIBUTING TABLETS IN BLISTER POCKETS OF A PACKAGING STRIP OF A MACHINE OF BLISTER-PACK PACKAGING TYPE

(71) Applicant: ELIZABETH EUROPE, La Chaussee-Saint-Victor (FR)

(72) Inventor: Philippe Colombat, Valencisse (FR)

( * ) Notice: Subject to any disclaimer, the term of this patent is extended or adjusted under 35 U.S.C. 154(b) by 319 days.

(21) Appl. No.: 16/619,684

(22) PCT Filed: May 30, 2018

(86) PCT No.: PCT/EP2018/064239
§ 371 (c)(1),
(2) Date: Dec. 5, 2019

(87) PCT Pub. No.: WO2018/234001
PCT Pub. Date: Dec. 27, 2018

(65) Prior Publication Data
US 2020/0140126 A1    May 7, 2020

(30) Foreign Application Priority Data
Jun. 22, 2017    (EP) .................................... 17177457

(51) Int. Cl.
*B65B 5/10*        (2006.01)
*B65B 59/04*       (2006.01)
(Continued)

(52) U.S. Cl.
CPC ............ *B65B 5/103* (2013.01); *B65B 59/001* (2019.05); *B65B 59/04* (2013.01);
(Continued)

(58) Field of Classification Search
CPC ....... B65B 5/103; B65B 59/001; B65B 59/04; B65B 9/045; B65B 35/08; B29L 2031/7164; G07F 17/0092
(Continued)

(56) References Cited

U.S. PATENT DOCUMENTS

| 5,737,902 A * | 4/1998 | Aylward ................. B65B 39/14 53/539 |
| 2006/0201109 A1* | 9/2006 | Van Eenoo ............. B65B 35/08 53/250 |
| 2009/0260321 A1* | 10/2009 | Jans ........................ B65B 35/06 53/147 |

FOREIGN PATENT DOCUMENTS

| FR | 2759346 A1 * | 8/1998 | ............. B65B 59/00 |
| FR | 2759346 A1 | 8/1998 | |
| FR | 2882987 A1 | 9/2006 | |

OTHER PUBLICATIONS

ESPACENET machine translation of FR-2759346-A1 (Year: 1998).*
International Search Report for corresponding PCT/EP2018/064239.

* cited by examiner

*Primary Examiner* — Anna K Kinsaul
*Assistant Examiner* — Himchan Song
(74) *Attorney, Agent, or Firm* — Egbert, McDaniel & Swartz, PLLC

(57) ABSTRACT

Disclosed is a reconfigurable device for dispensing/distributing tablets in the blister pockets of a packaging strip subjected to longitudinal movement in a substantially horizontal plane of a packaging machine having a blister-packer, the reconfigurable device having a frame designed to be mounted on the blister-packer, the frame having a front attachment wall preferably arranged vertically, at least one accessory for dispensing/distributing the tablets in the blister pockets of the strip, the accessory being designed to be
(Continued)

mounted removably on the frame. The device includes an intermediate interface intended to be attached removably to the frame, against the front attachment wall thereof, in order to support the at least one accessory. The interface includes at least one drive member of a mobile element of the accessory/accessories supported thereby.

20 Claims, 23 Drawing Sheets

(51) Int. Cl.
*B65B 59/00* (2006.01)
*B29L 31/00* (2006.01)
*B65B 9/04* (2006.01)
*B65B 35/08* (2006.01)
*G07F 17/00* (2006.01)

(52) U.S. Cl.
CPC ....... *B29L 2031/7164* (2013.01); *B65B 9/045* (2013.01); *B65B 35/08* (2013.01); *G07F 17/0092* (2013.01)

(58) Field of Classification Search
USPC .......... 53/235, 473, 475, 525, 558; 209/552, 209/634, 651–654, 659, 680, 682, 706, 209/920–922
See application file for complete search history.

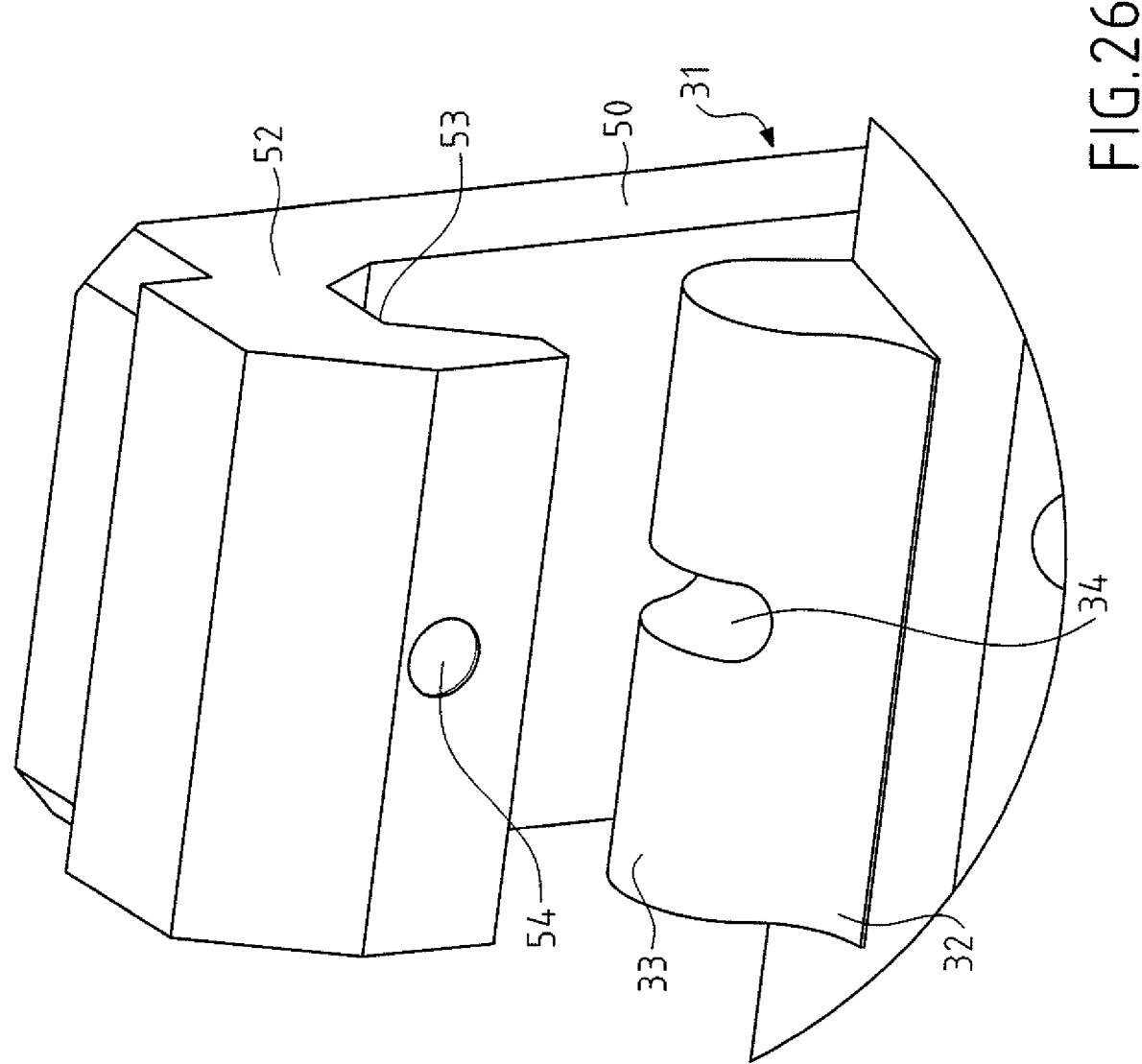

RECONFIGURABLE DEVICE FOR DISPENSING/DISTRIBUTING TABLETS IN BLISTER POCKETS OF A PACKAGING STRIP OF A MACHINE OF BLISTER-PACK PACKAGING TYPE

The present invention relates to tools for packaging medicinal products, and more particularly tablet dispensing/distribution systems.

Numerous packaging installations suitable for dispensing/distributing tablets or capsules into longitudinally moving blister-pocketed strips exist in the prior art. For example, the tablets are distributed into blister pockets of packs thermoformed in a sheet of synthetic material, for example a transparent plastic material, the blister-pocketed strips subsequently receiving at another workstation a sealing film such as a protective aluminium film.

The strip is converted by a specific blister pack packaging machine into a strip provided with blister pockets. The blister pockets of the strip are filled automatically by a tablet feed system, then the filled blister pockets are covered with said protective film. There are known, on one hand, blister pack packaging machines wherein the strip feed is continuous and, on the other, machines wherein the strip feed at the level of tablet unloading is discontinuous.

Existing installations carry out tablet distribution over the width of the longitudinally travelling strip. The distribution part is disposed downstream from a temporary storage container of tablets to be dispensed and usually includes a dispensing hopper as well as means supplying the tablets in waves such that they form a pile over the entire width of the travelling strip. One or a plurality of rotary cylindrical brushes are then provided downstream from the tablet pile storage zone, the axis of rotation of these brushes being transversal to the direction of travel of the sheet, so as to fill all the blister pockets as the strip moves forward.

A constraint frequently encountered with this installations is the need to change the entire dispensing part between the storage container and the blister-pocketed strip when the type of tablets manufactured changes. Furthermore, it is necessary to prevent the slightest risk of contamination of one tablet molecule with another molecule, and furthermore it is necessary to change the dispensing configuration when the format of the tablets, and that of the strip, is substantially modified. Thus, while equipment with a chute connected to a unit open in the bottom part thereof and provided with rotary brushes enables optimal filling of the blister pockets for rounded-format tablets, such a filling mode becomes inoperative for tablets having a more elongated or rectangular shape.

For formats of the latter type, it is generally necessary to use at least one dispensing ramp provided with grooves, or equivalent separations, suitable for pre-positioning the tablets. Feed systems conveying the tablet to be packaged individually into each blister pocket already exist. The tablets, guided by vertical or inclined, vibratory or fixed, ramps are placed individually in the blister pockets of the strip travelling under the bracket.

One drawback of existing installations is that it is necessary to have multiple specific heavy equipment, this equipment having to be alternately assembled and disassembled in the packaging line whenever the tablet dispensing/distribution mode changes. The assembly-disassembly operations require a lot of time and cause a shutdown of packaging prejudicial for productivity.

There is also known via the patent FR 2 759 346 of the same applicant a blister pocket filling device which is mobile and suitable for different format types, a plurality of functional elements optionally being used and changed in the same unit covering the blister-pocketed strip. However, this type of system does not enable the blister pocket filling rate to be optimised, in particular for tables of elongated shape or complex shape.

A solution for these drawbacks was also proposed in its patent FR 2 882 987 which related to a reconfigurable dispensing system offering interchangeability between different dispensing configurations, while complying with the good manufacturing practices required in the pharmaceutical field.

However, this type of device is not entirely satisfactory. Indeed, the size thereof remains large and renders the integration thereof difficult on certain blister packaging machines, the flexibility thereof is still lacking, the fixed position of the actuators and of the attachment points of the dispensing solutions render the use of new dispensing solutions difficult, the height adjustment acts simultaneously upon the dispenser and upon the brush for laying the tablets, and the front is difficult to clean due to the presence of all the actuators and of all of the attachment points required for the different dispensers.

An aim of the present invention is therefore that of solving the problems cited above using a solution.

More specifically, the present invention relates to a reconfigurable device for dispensing/distributing tablets into the blister pockets of a packaging strip subjected to a longitudinal movement in a substantially horizontal plane of a packaging machine comprising a blister-packer, said reconfigurable device comprising:
  a frame designed to be mounted on the blister-packer, said frame comprising a front attachment wall preferably arranged vertically,
  at least one accessory for dispensing/distributing said tablets in the blister pockets of the strip, such as a rotary brush box, a fixed ramp, a vibratory ramp, a tube-operated alternating dispenser, said accessory designed to be mounted removably on said frame,
  characterised in that it further comprises an intermediate interface intended to be attached removably to the frame, against the front attachment wall thereof, in order to support at least one accessory, said interface including at least one drive member of a mobile element of the accessory/accessories supported thereby.

Thus, the system according to the invention enables interchangeability between different dispensing configurations by means of the removable nature with respect to the frame of the dispensing elements in contact with the tablets.

By means of this configuration, not only is it no longer necessary to carry out a time-consuming disassembly of all of the dispensing equipment but it is possible to mount numerous types of dispensing/distribution accessories. By means of this scalable interface, various options are proposed in kit form and may thus be installed as needed. Moreover, the interfaces include the actuators which were previously situated in the frame, making it possible in particular to reduce the size thereof and particularly the height thereof considerably. The interfaces are generally suitable for operation by one person and the installation thereof is performed without tools, in a few steps (positioning, tilting, clamping).

According to preferred embodiments of the present invention:
  the attachment means of the interface to the frame are of the type using no tools and comprise, for the interface, at least one upper hook comprising a rounded inner surface and, for the front attachment wall of the frame, at least one associated upper protuberance comprising a rounded outer surface, each hook being suspended above the corresponding protuberance such that the inner surface thereof moulds the outer surface of the protuberance;

each hook of the interface comprises a guiding pin engaging with a groove formed in the protuberance of the front attachment wall of the frame;

the front attachment wall of the frame is divided into at least two independent attachment parts suitable for each receiving at least one removable accessory, either via a single interface mounted on said attachment parts, for example to connect a longitudinal brush box, or via a plurality of independent interfaces, for example to connect a vibratory ramp dispenser to a first upstream attachment part of the frame and a rotary brush for laying the tablets on a second downstream attachment part of said frame;

each attachment part of the front wall of the frame comprises its own vertical adjustment means along an axis Z;

said vertical adjustment means comprise an operating button acting upon at least one rail rigidly connected to said attachment part in question and sliding along at least one corresponding vertical guiding track rigidly connected to the frame, and a digital movement indicator graduated in tenths of millimetres;

one and/or the other of the attachment parts of the wall of the frame also comprise(s) horizontal depth adjustment means along an axis Y;

said horizontal depth adjustment means comprise an operating button acting upon at least one track rigidly connected to said part in question and sliding along at least one corresponding horizontal guiding rail rigidly connected to the frame, and a digital movement indicator graduated in tenths of millimetres;

one and/or the other of the various adjustment means is/are motorised;

one and/or the other of the attachment parts of the wall of the frame is/are further equipped with automated vertical movement means alternating in a square cycle between two predetermined positions, independently of the vertical adjustment means;

the front attachment wall and the intermediate interface respectively each comprise at least one connection module, said modules being connected to one another in the mounted position of the intermediate interface on said attachment wall in order to control the drive member(s) disposed inside the interface;

each connection module comprises male and female Harting connectors, pneumatic connectors and at least one guiding pin engaging with a corresponding orifice to facilitate the alignment of the connectors during the positioning of the intermediate interface on the attachment wall;

the wall of the frame comprises three female type Harting connectors surrounded laterally by two orifices, whereas the intermediate interface comprises three male type Harting connectors surrounded laterally by two guiding pins intended to be inserted into said orifices;

the front attachment wall comprises a plurality of horizontally aligned connection modules; and the connection modules comprise silent blocks enabling same to align with one another when mounting an interface onto the attachment wall.

Thus, the use of these connectors enhances design freedom for the creation of new dispensing solutions, enables acquisition of the various interfaces as needed, allows the exchange of interfaces from one blister pack packaging line to another, even if they are of different makes, and limits the number of machining operations on the wall, thus facilitating the cleaning of the fronts.

Advantageously, the device comprises means for securing the intermediate interface in the attached position on the frame, for example a clamping handle disposed laterally on an outer edge of the frame.

According to an additional feature, each accessory is connected removably to the intermediate interface by means of a click and lock type fastening on a front vertical wall thereof, and is connected to the associated drive member(s) of said interface.

Preferably, the overall frame has means for the longitudinal adjustment of the position thereof along an axis X, which may be motorised.

Advantageously, these means comprise two parallel rails rigidly connected to the frame whereon slide two tracks rigidly connected to the supporting structure and a measuring rule.

According to a further specificity, the drive members are rotary motors, gear motors or actuation cylinders.

The invention also relates to a packaging machine comprising a blister-packer provided with a supporting structure and a dispensing rail along which circulates a blister-pocketed packaging strip subjected to longitudinal movement in a substantially horizontal plane, and a reconfigurable device for dispensing/distributing tablets into said blister pockets as described above, the accessory being placed above the blister-pocketed strip.

Advantageously, the machine device further comprises a touchscreen control panel, offset or mounted directly on the device or on the supporting structure of the blister-packer, such that the accessories are devoid of control means.

The invention will now be described in more detail with reference to particular embodiments given merely by way of illustration and represented in the appended figures wherein FIG. 1 is a schematic perspective view of a machine for dispensing/distributing tablets according to the present invention;

FIG. 26 is a detailed view of FIG. 20;

Figure 1:
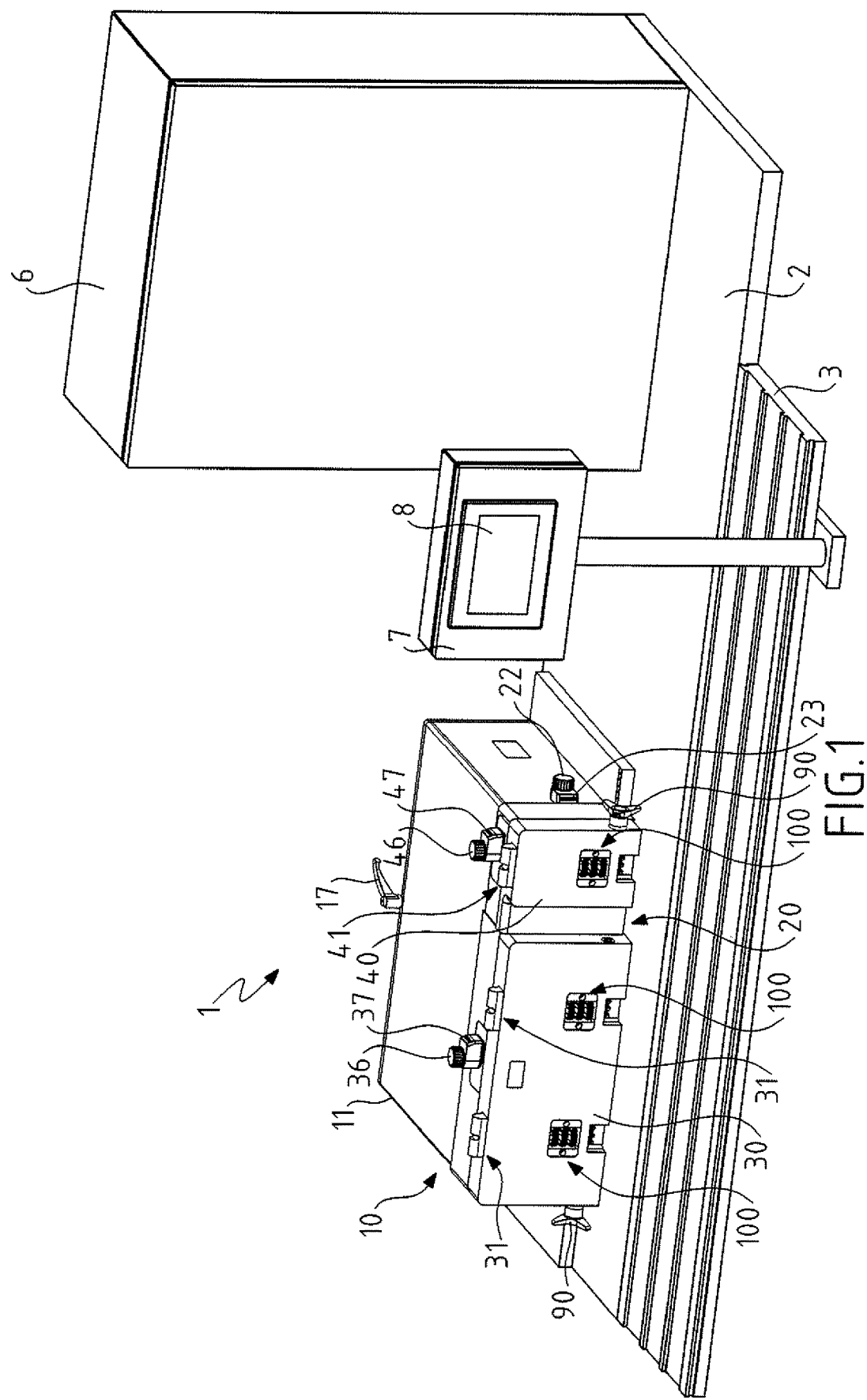
Figure 2:
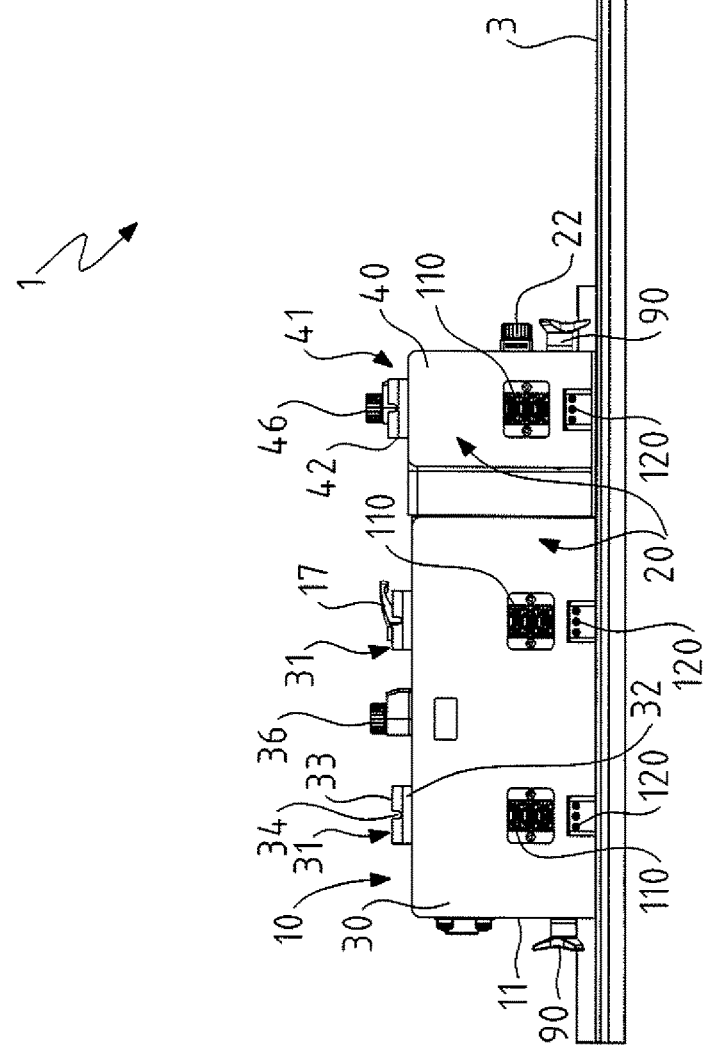
FIG. 2 is a front view of FIG. 1.
Figure 3:
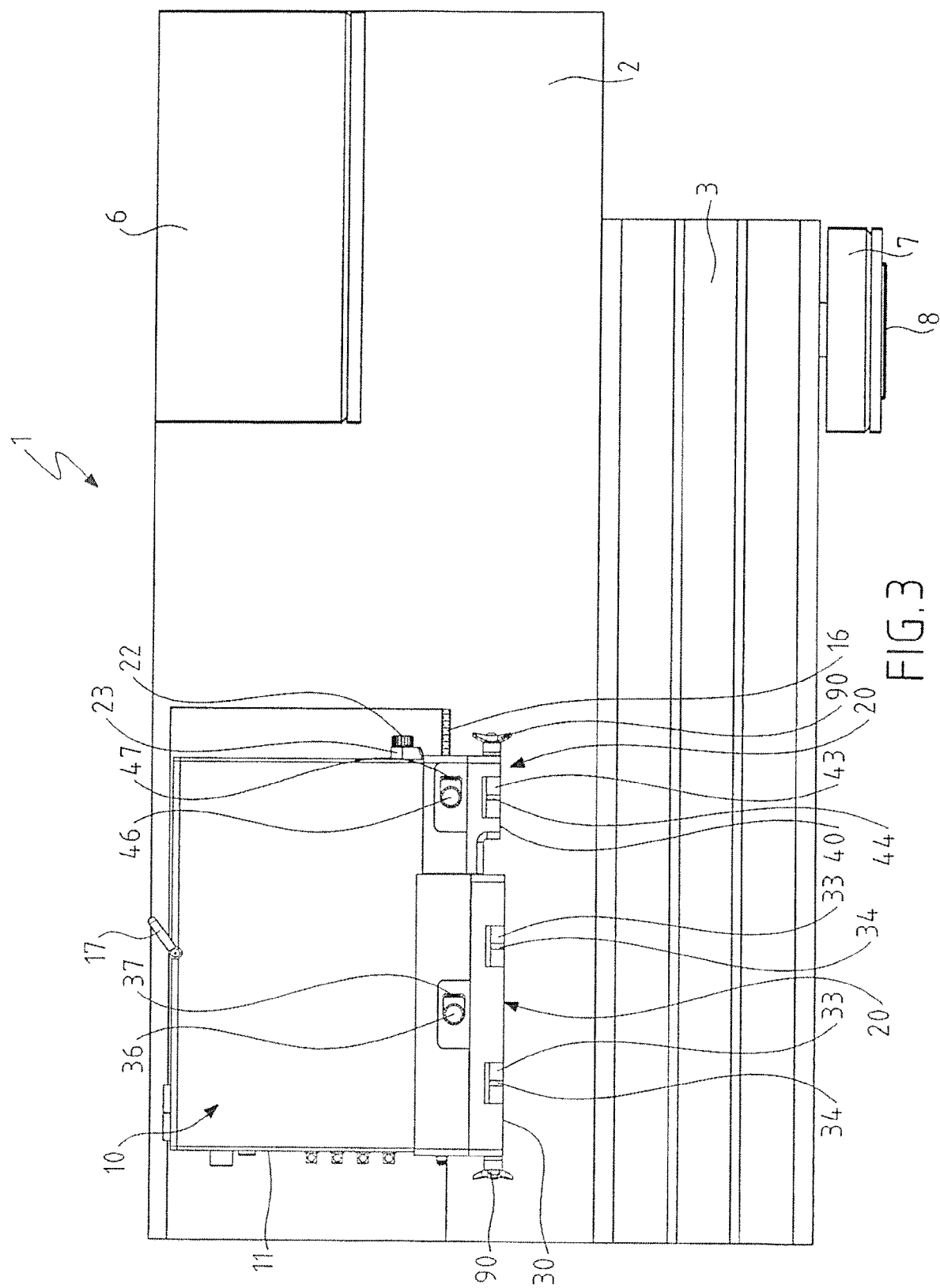
FIG. 3 is a top view of FIG. 1.
Figure 4:
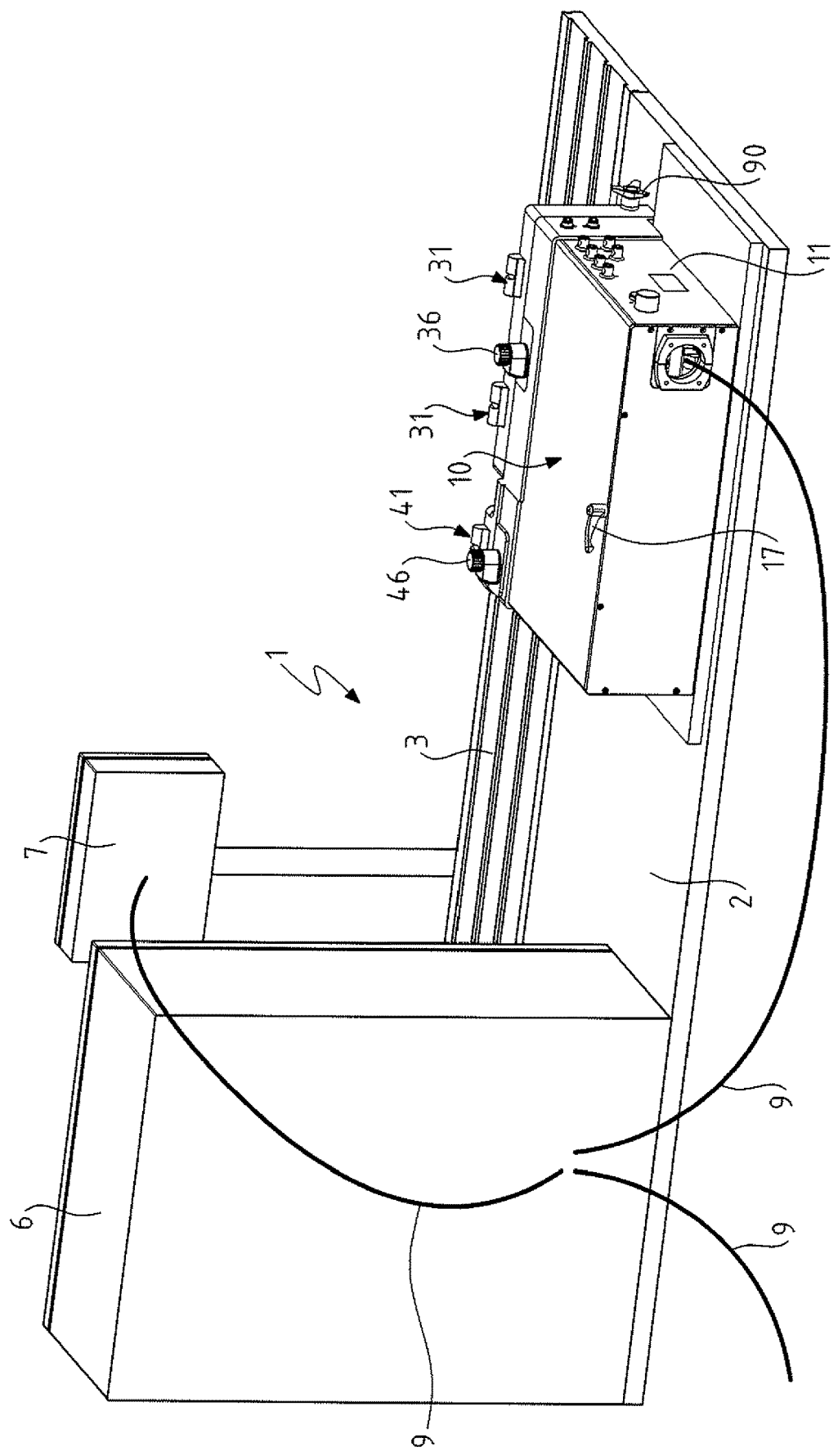
FIG. 4 is a rear view of FIG. 1.

In the example represented and described hereinafter, the invention is applied to the dispensing of tablets in a packaging installation. Obviously, the invention applies in the same way to the dispensing of hard capsules, soft capsules or other products to be distributed into blister-pocketed strips. Also, hereinafter in the description, tablets may be understood as describing this type of products in general.

FIGS. 1 to 4 represent a packaging machine particularly comprising:

- a blister-packer 1 provided with a supporting structure 2 and a dispensing rail 3 mounted on said supporting structure 2 and along which a blister-pocketed packaging strip of known type moves longitudinally in a substantially horizontal plane,
- a reconfigurable device 10 for dispensing/distributing tablets into said blister pockets provided with an electrical cabinet 6 and a touchscreen 8 control panel 7, and
- various electrical connections 9 connecting the electric cabinet 6 to the blister-packer 1, to the device 10 for dispensing/distributing tablets and to the control panel 7.

As seen in most of the figures, the device 10 comprises a frame 11 intended to be mounted on the supporting structure 2 of the blister-packer 1 and has a front attachment wall 20 intended to removably support tablet dispensing/distribution accessories of known type.

More specifically, the front attachment wall 20 is divided longitudinally into two separate parts 30 and 40 each suitable for supporting one or plurality of accessories, as will be explained below.

Figure 10:
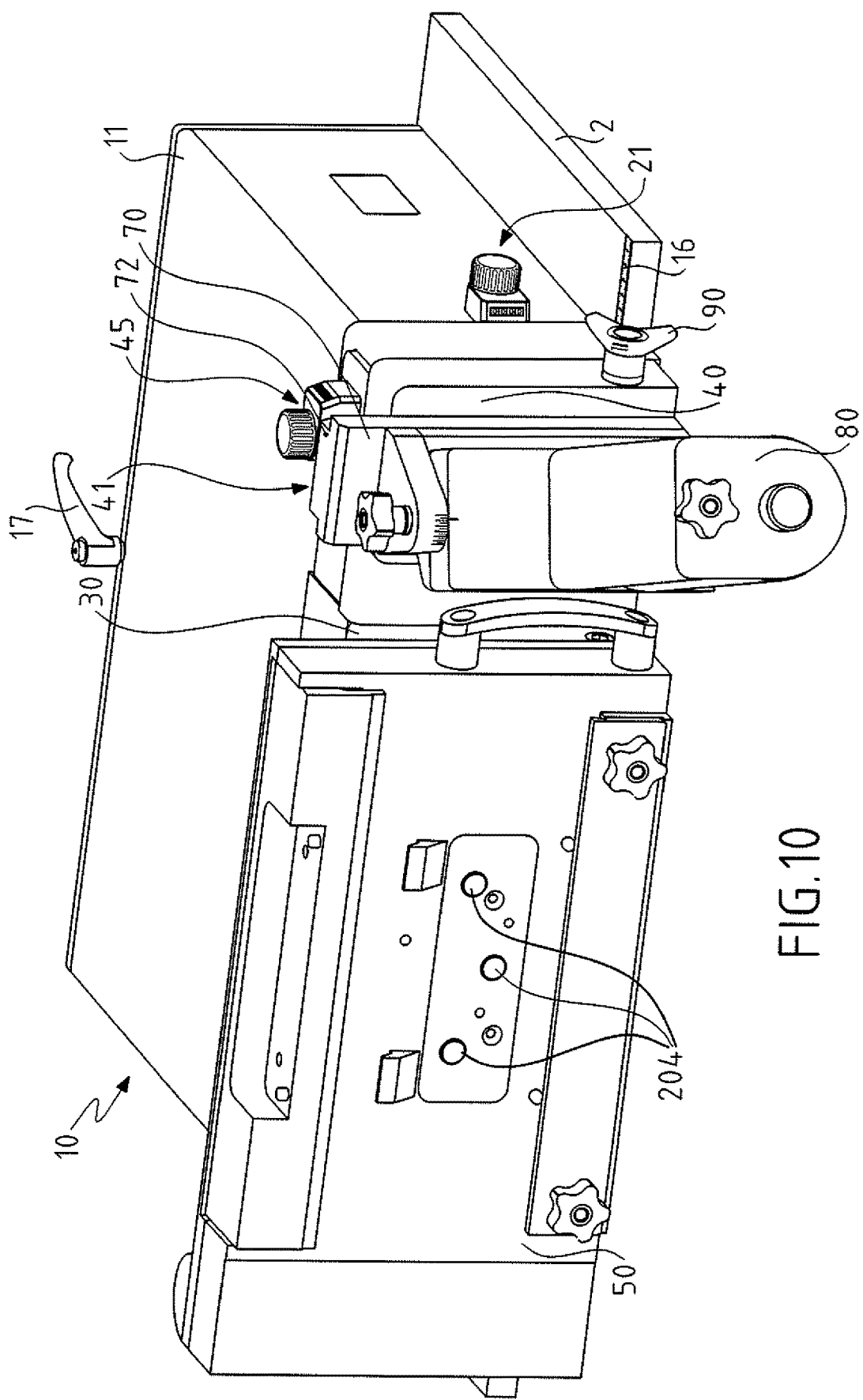
FIG. 10 is a similar view to FIG. 5 but wherein intermediate interfaces are mounted on the dispensing/distribution device.
Figure 11:
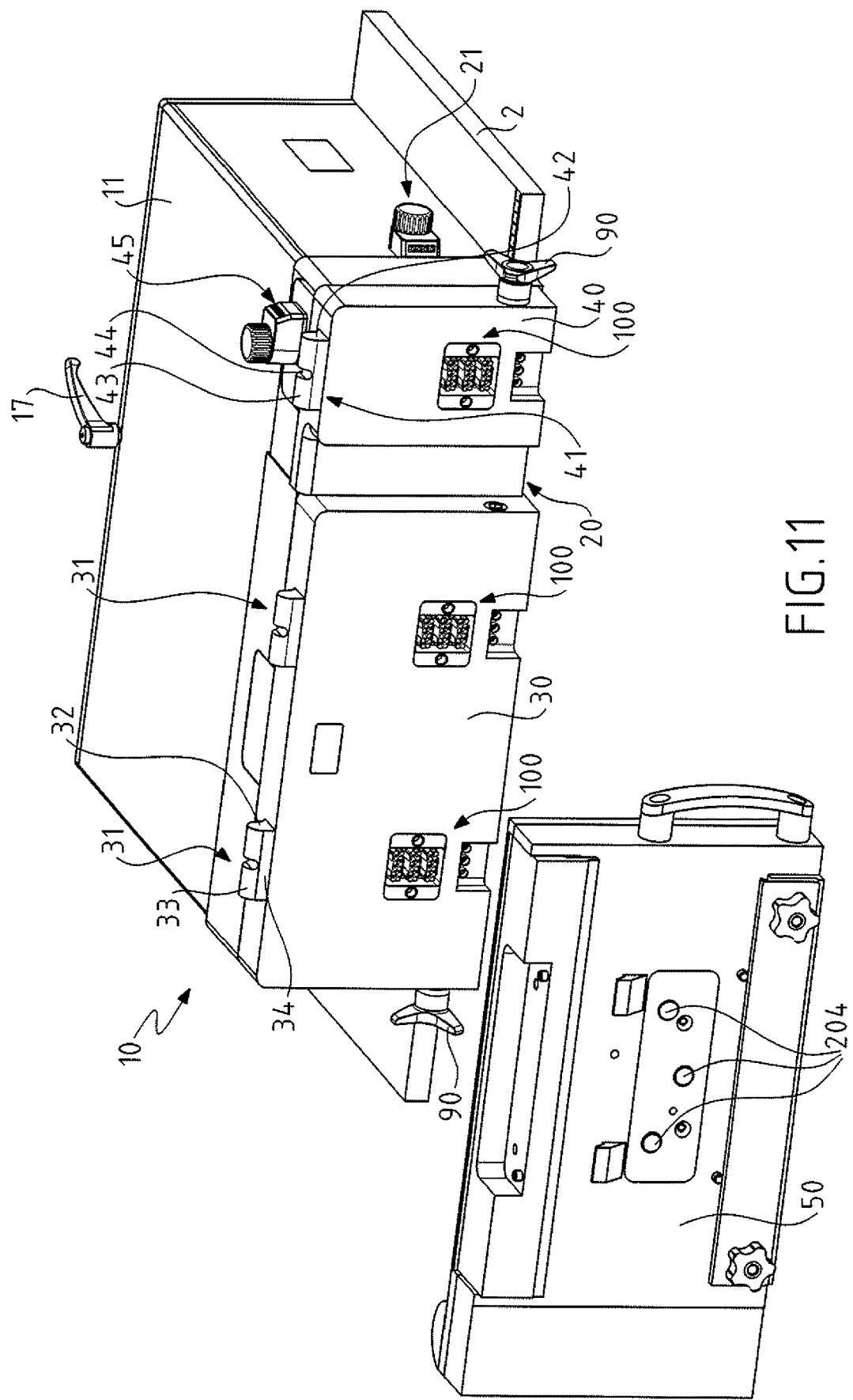
FIG. 11 is a partial exploded perspective view of FIG. 10.
Figure 12:
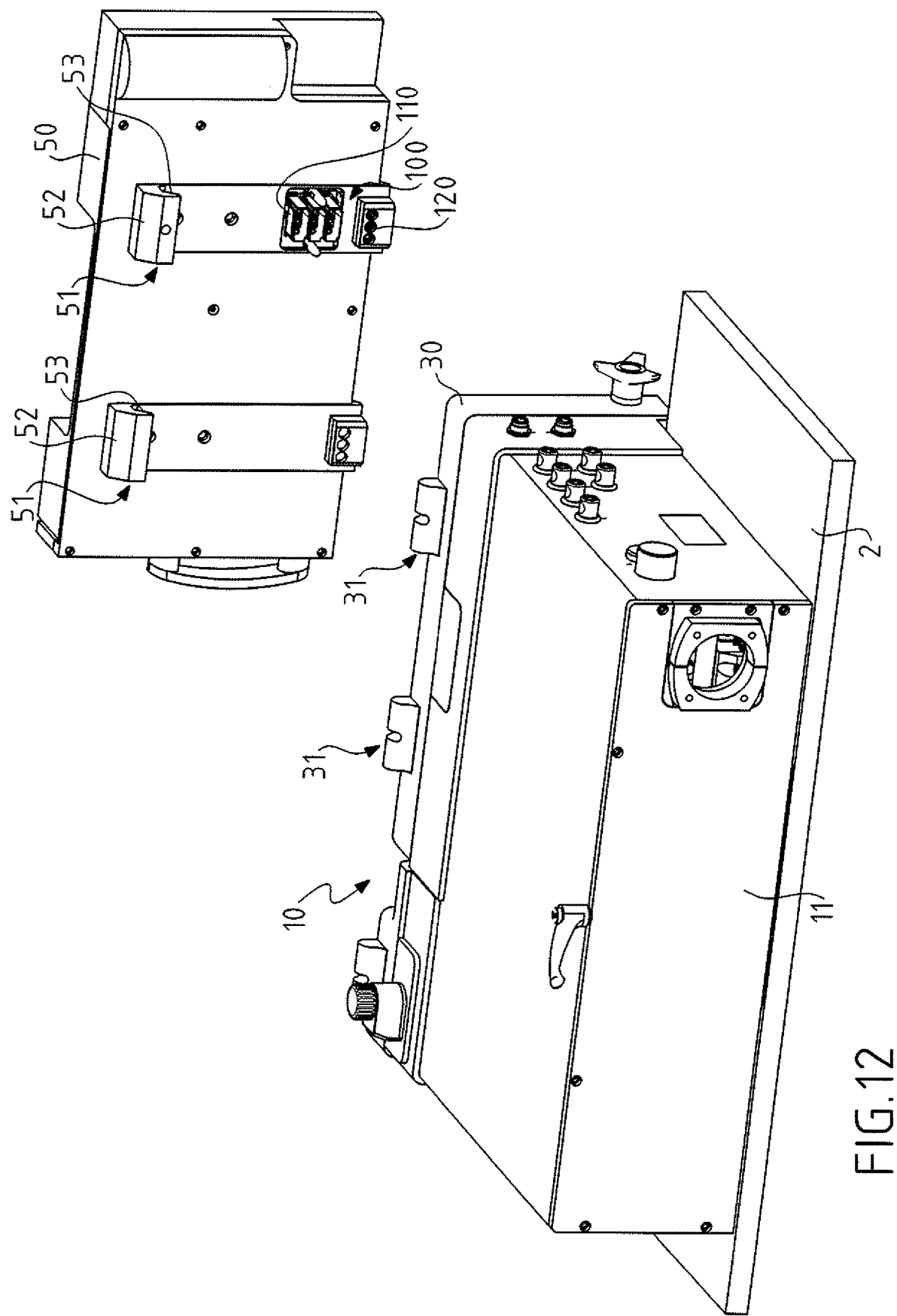
FIG. 12 is a rear view of FIG. 11.

Thus, in accordance with FIGS. 10 to 12, the first upstream part 30 of the attachment wall 20 along the direction of circulation of the blister-pocketed strip comprises for this purpose attachment means 31 of a first intermediate interface 50, whereas the second downstream part 40 of the attachment wall 20 comprises attachment means 31 of a second intermediate interface 70.

More specifically, these attachment means 31, of the type free from use of tools and therefore entirely suitable for manual handling, comprise two upper protuberance 32 each having a rounded outer surface 33.

In parallel, as represented in FIG. 12, the intermediate interface 50 is provided with complementary attachment means 51 comprising two upper hooks 52 each having a rounded inner surface 53 engaging with the outer surface 33 of the corresponding protuberance 32 when the interface 50 is suspended from the first part 30 of the attachment wall 20. So that the intermediate interface 50 can be mounted readily and rapidly by the user, each of the hooks 52 of the interface comprises a guiding pin 54 engaging with a groove 34 formed in each of the protuberances 32 of the first part 30 of the attachment wall 20, as illustrated in more detail in FIG. 26. In the embodiment illustrated, the first interface 50 supports for example a tube-operated dispenser of known type and not represented.

In the same way, as seen in FIG. 11, the second part 40 of the attachment wall 20 is provided with attachment means 41 comprising a single upper protuberance 42 having a rounded outer surface 43 provided with a groove 44 so as to support a second interface 70 having a hook 72 identical to the hooks 52 of the first interface 50. In the embodiment illustrated, the second intermediate interface 70 supports a rotary brush 80 for laying tablets of known type.

Figure 18:
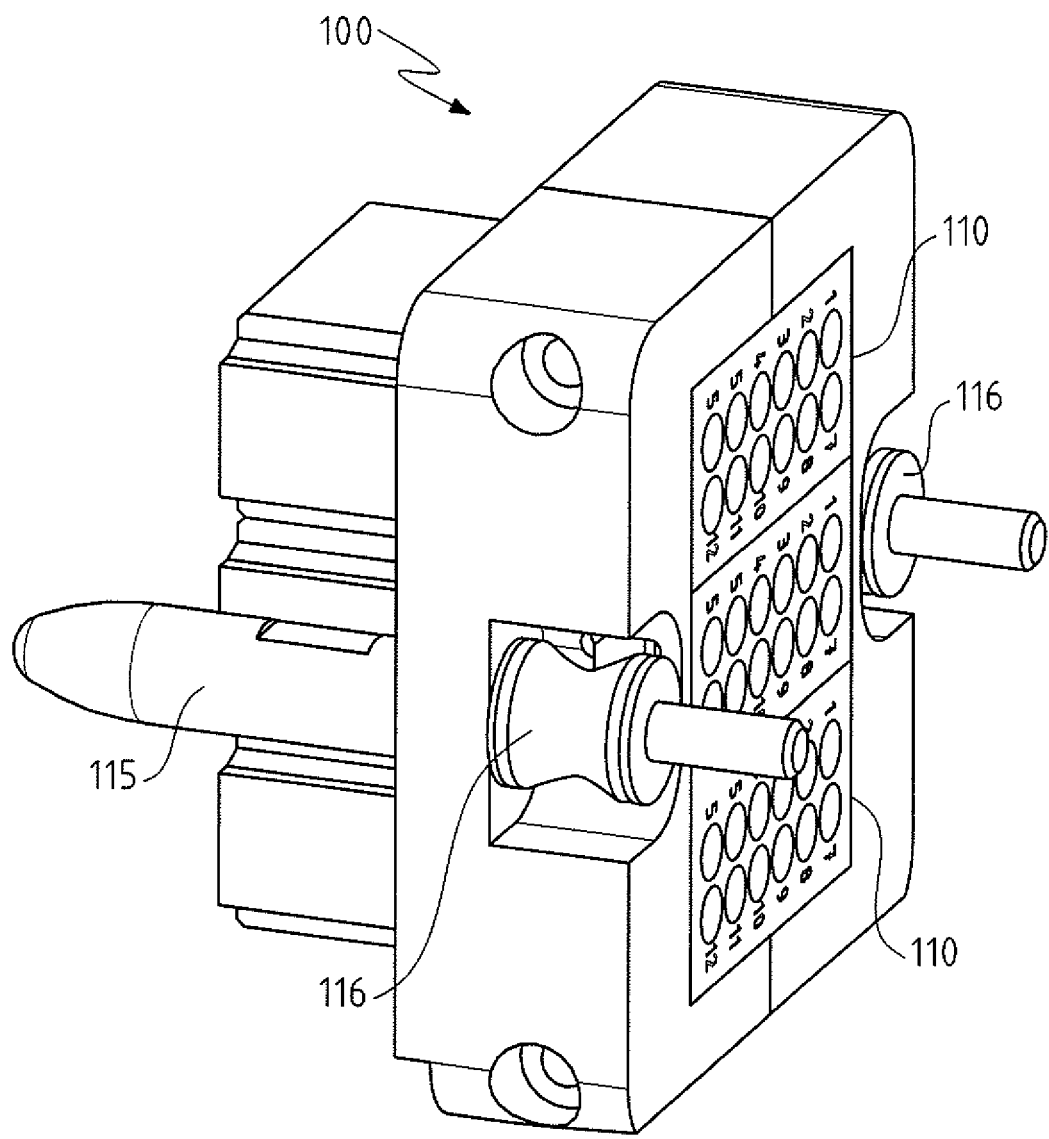
FIG. 18 is a perspective view of FIG. 12.
Figure 19:
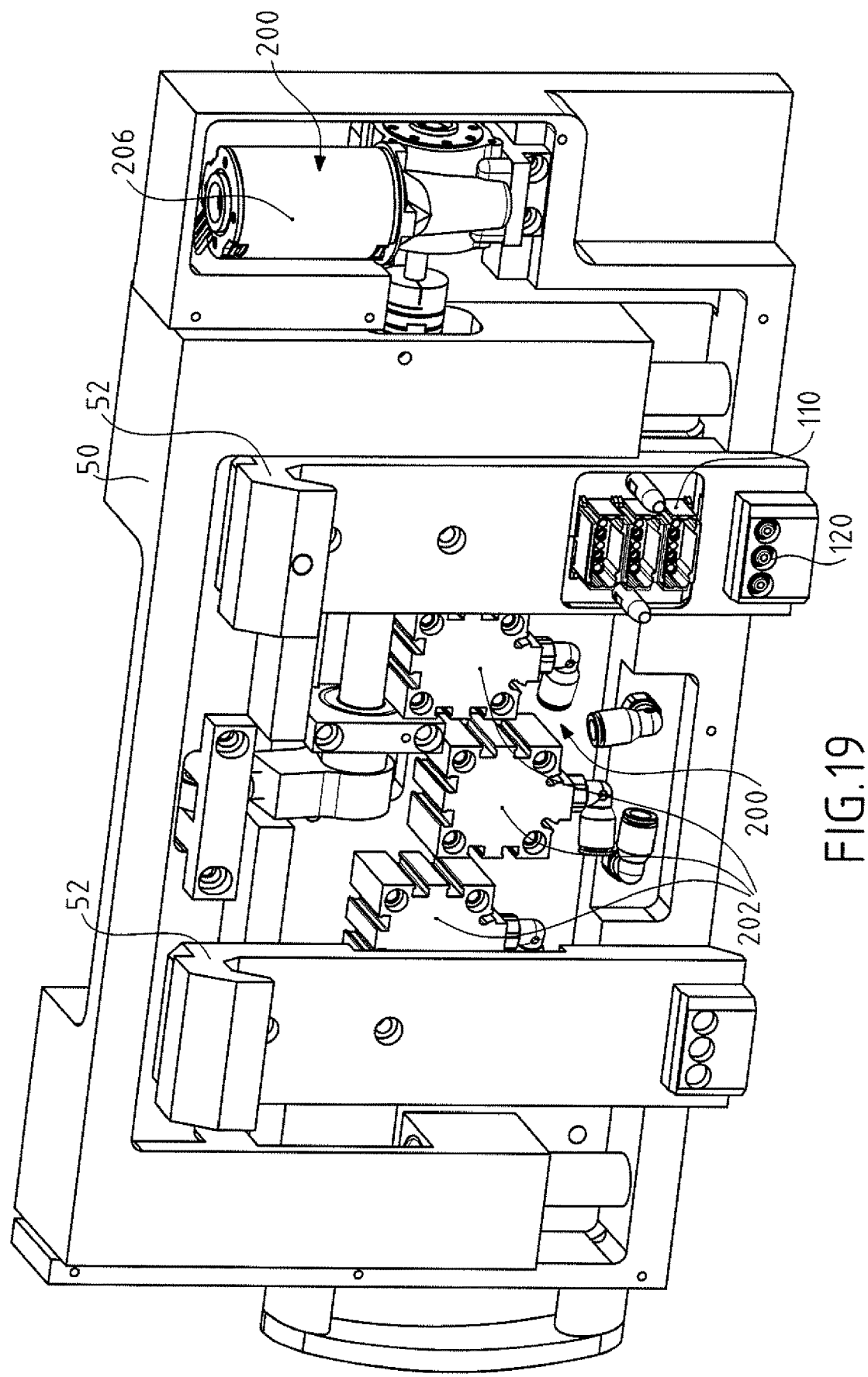
FIG. 19 is an inside view of the interface in FIGS. 10 to 12.

A first important feature of this invention lies in that each intermediate interface includes drive members 200 initially disposed in the frame 11 of the device 1. Thus, as seen in FIG. 18, according to the embodiment in FIGS. 10 to 12, the interface 50 includes cylinders 202 extending along the outer surface of said interface by actuation tappets 204, for example intended to actuate mobile cassette racks of a tube-operated dispenser (of known type and therefore not shown), and a gear motor 206, for example used to apply an oscillation movement of a dispensing hopper (of known type and not shown).

Figure 13:
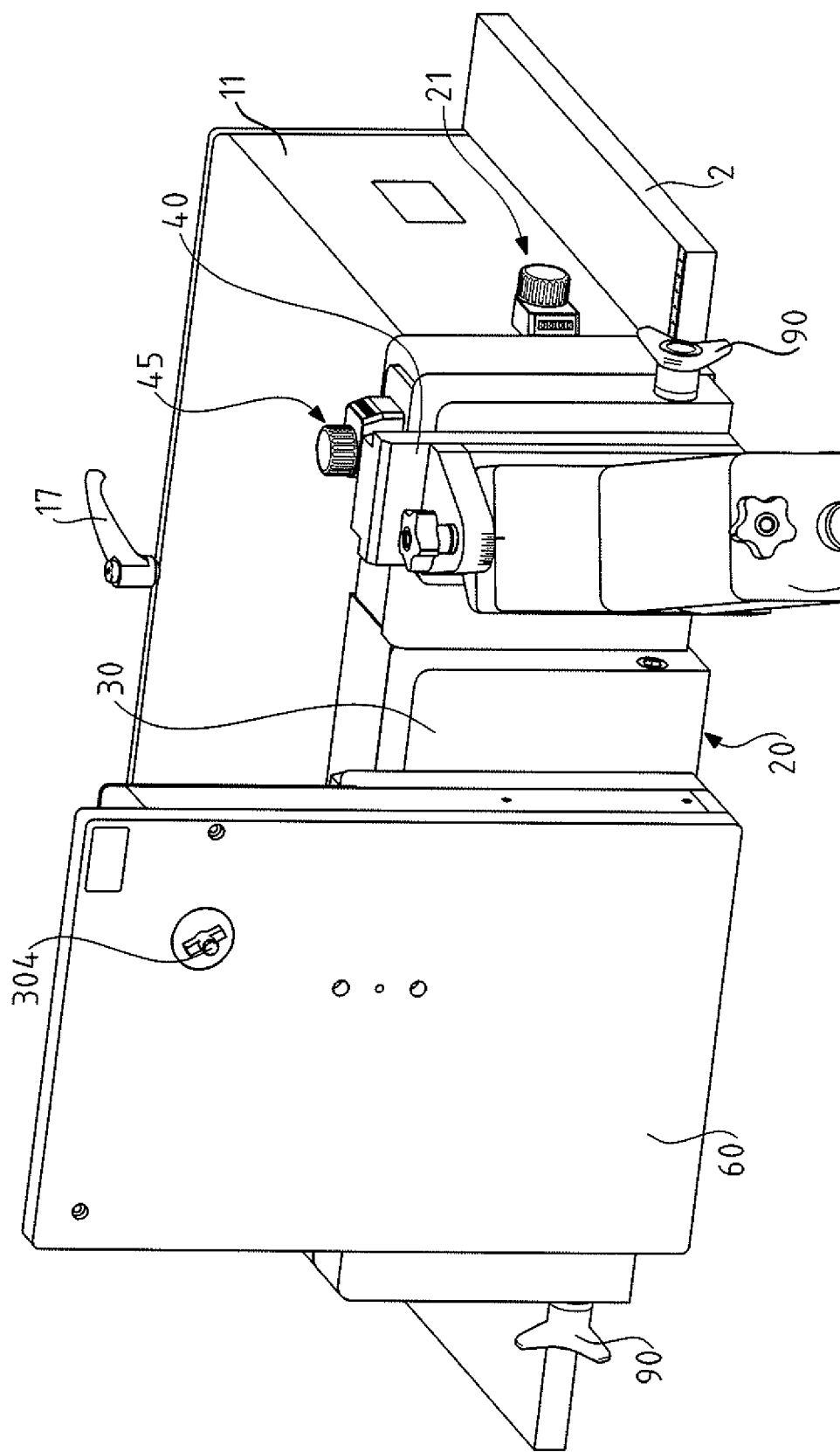
FIG. 13 is an alternative embodiment of FIG. 10.

According to a first alternative embodiment illustrated by FIG. 13, a further first intermediate interface 60 is suspended from the first part 30 of the attachment wall 20, with the same type of hook and protuberance attachment means as those described with reference to FIGS. 10 to 12. In this case, this intermediate interface 60 makes it possible to support a fixed ramp dispenser of known type and not shown, wherein the mobile inner elements may be rotated by means of a protruding tappet 304.

Figure 14:
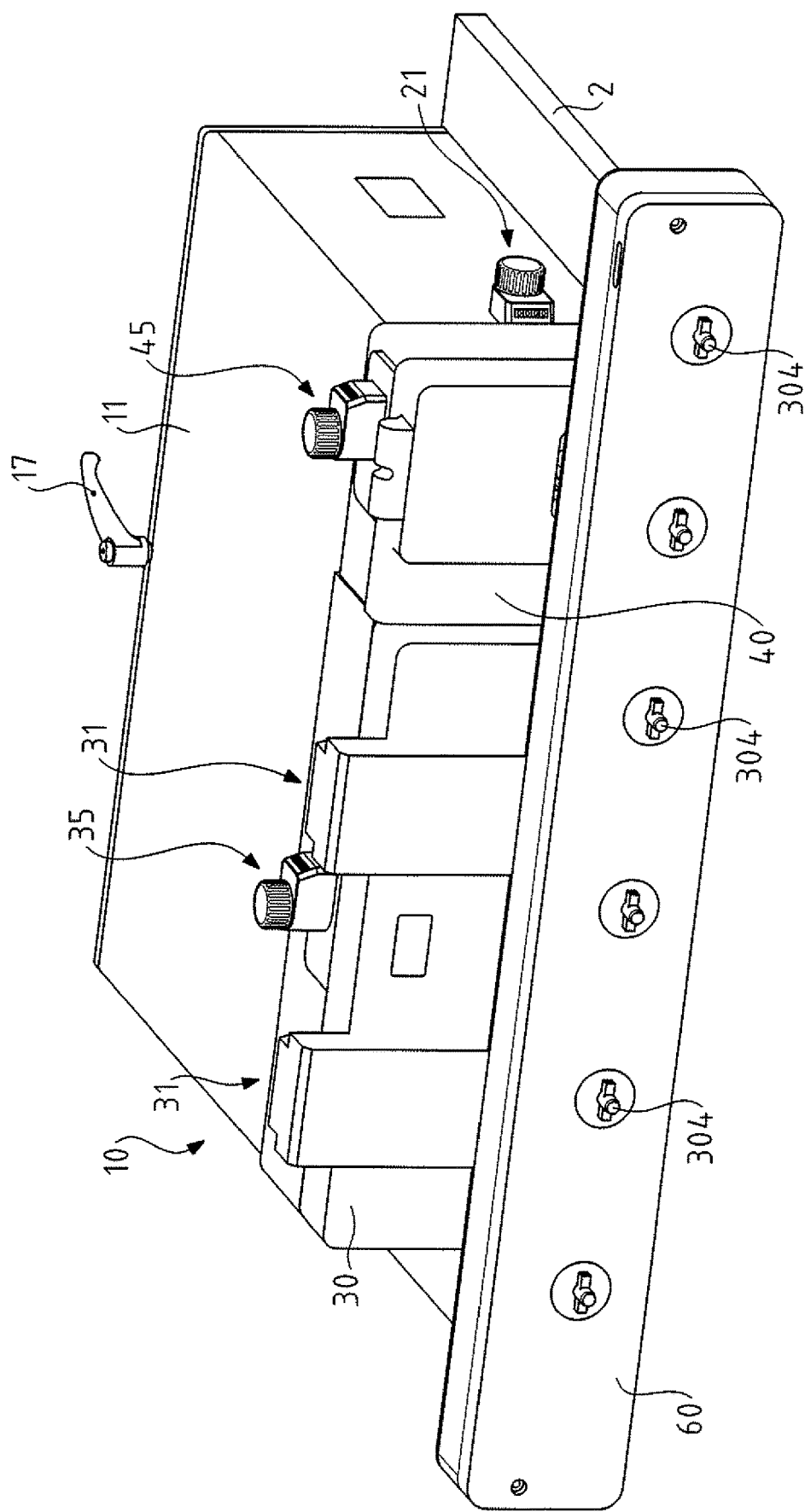
FIG. 14 is a further alternative embodiment of FIG. 10.

According to a third embodiment illustrated by FIG. 14, the first interface 60 is suspended from the first upstream part 30 of the attachment wall 20 but extends over the entire width of the device 10 such that it is also positioned in front of the second downstream part 40 of the attachment wall 20. In this case, it may consist of a brush box type dispenser 85 such as that represented in FIG. 15, said brushes are then rotated via various tappets 304 protruding from the interface 60 and rotated by motors inside said interface.

A further important feature of the present invention is the presence of male/female type connection modules 100 connected, when each interface is correctly positioned, in order to control the internal drive members provided in said interfaces.

Thus, as seen in FIGS. 1, 2, 5, 6, and also more specifically in detailed views 16 to 18, these male/female connection modules 100 comprise for example Harting type connectors 110 (male and female) and pneumatic connectors 120 (male and female). More specifically, the first (widest) part 30 of the attachment wall 20 is provided with two connection modules 100 each comprising three twelve-pin female type Harting connectors 110 and a 3-pin female type connector to engage with the Harting connectors 110 and pneumatic connectors 120, respectively of male type, of the associated intermediate interface 50 or 60. The second part 40 of the attachment wall 20 comprises for its part a single connection module 100 engaging with that of the second intermediate interface 70.

Figure 15:
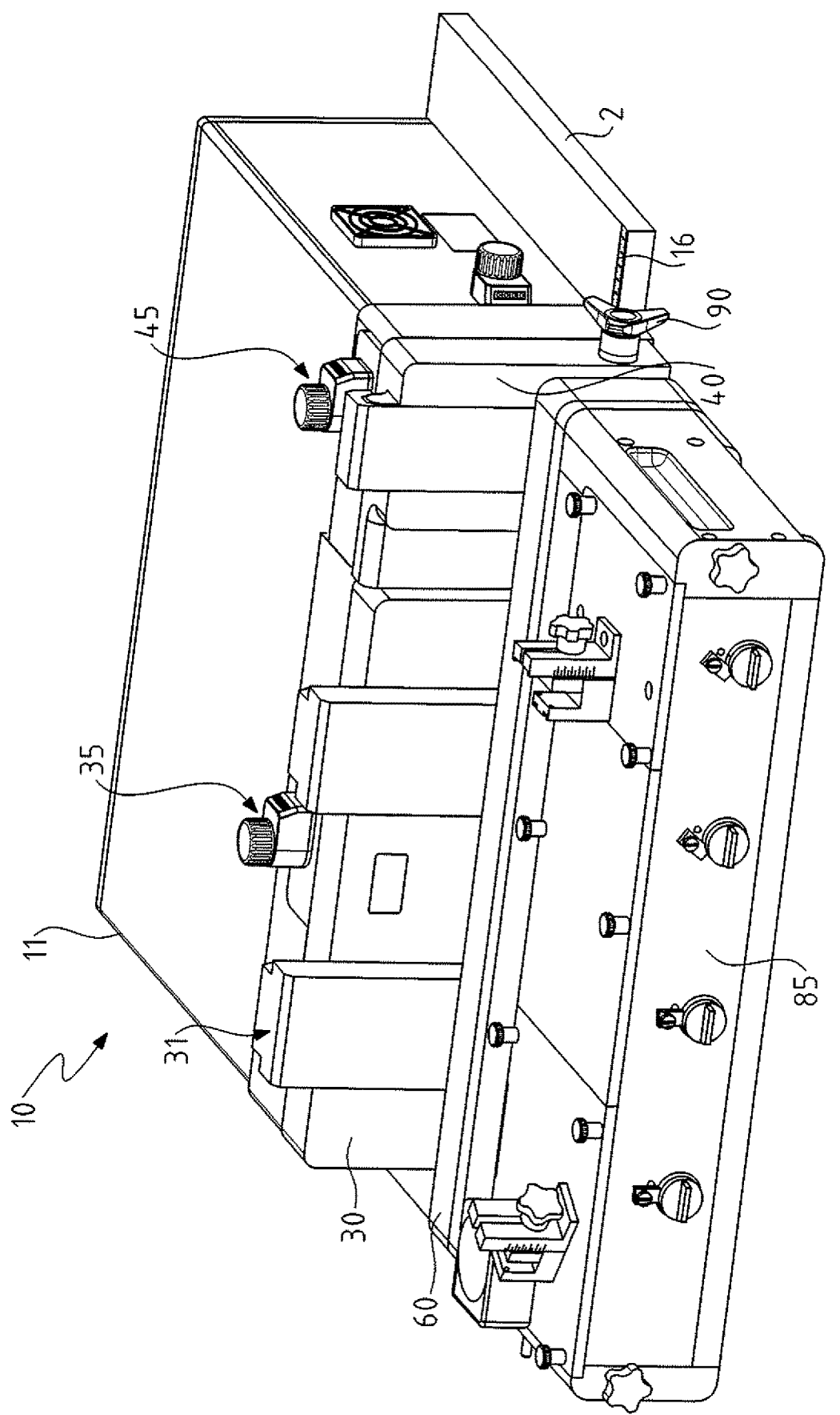
FIG. 15 is a similar view to FIG. 14 wherein a suitable accessory is mounted.
Figure 17:
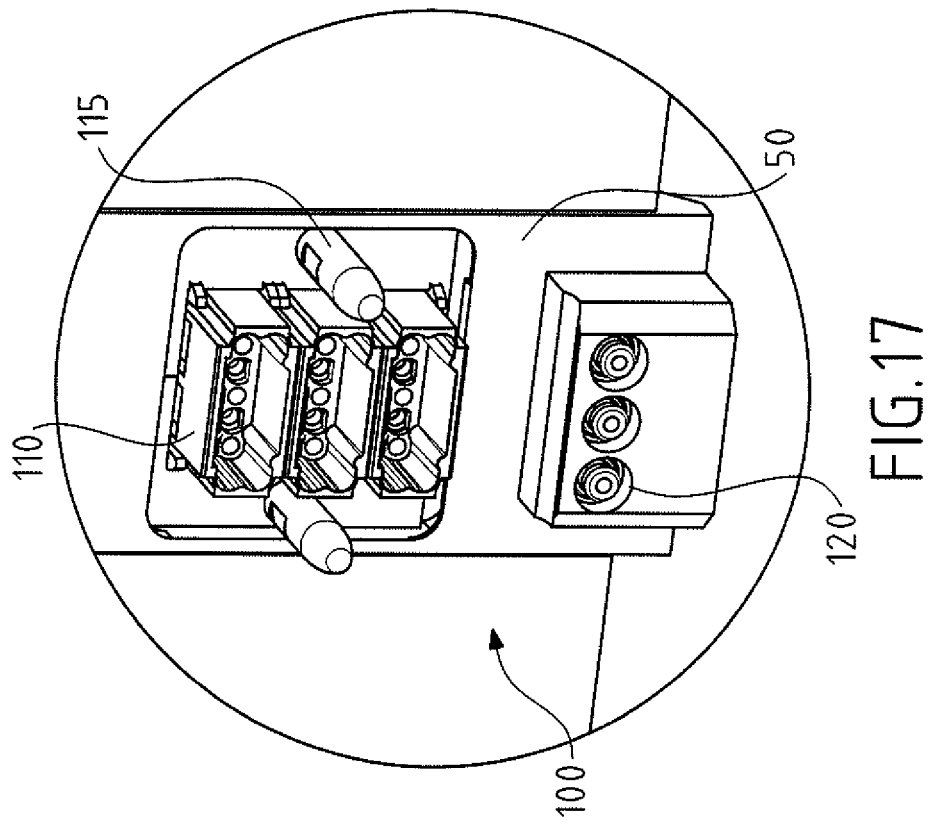
FIG. 17 is a detailed view of FIG. 12.
Figure 16:
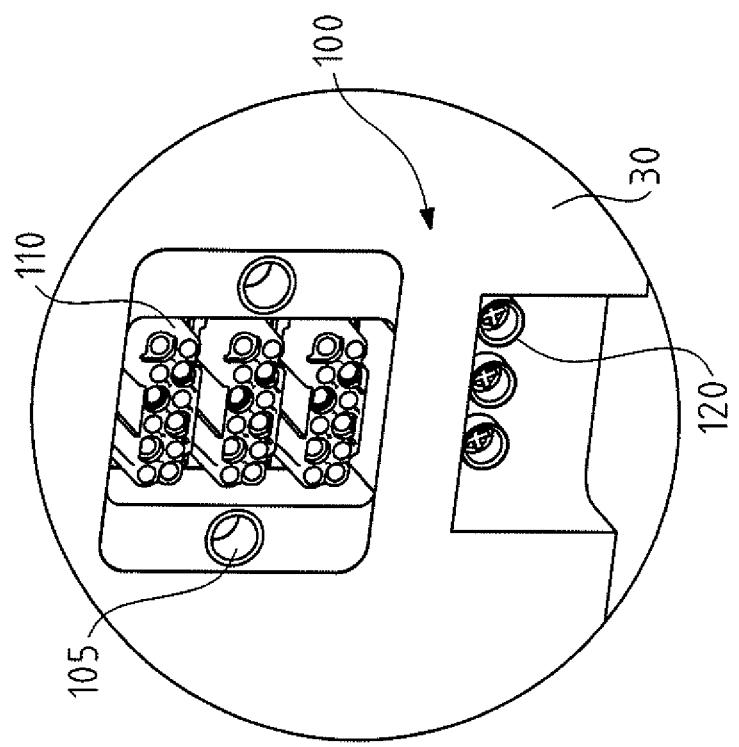
FIG. 16 is a detailed view of FIG. 11.

In order to enable an optimised connection between the two parts of each connection module 100, the latter are provided, in terms of the attachment wall 30 or 40, with an orifice 105 and, in terms of the intermediate interface 50, 60 or 70, guiding tappets 115 engaging with said orifices 105. Advantageously, the tappets 115 and the orifices 105 are disposed on either side of the pins of the Harting connectors 110, as seen in FIGS. 15 and 16.

Moreover, as illustrated in FIG. 18, the rear of the connection modules 100 of each interface (regardless of the interface) comprise bobbin-shaped silent blocks 116 mounted on the rear of the guiding tappets 115. This makes it possible, when mounting the interface which will be described hereinafter, to create degrees of freedom along the Y and Z axes for the connection module 100 of the interface in question.

The detailed views 20 to 25 illustrate the positioning of an intermediate interface on the front wall 20 of the frame 11 of the device 10 for dispensing/distributing tablets, and more specifically the positioning of the intermediate interface 50 on the first part 30 of said wall. This installation is carried out without tools and very simply. It only requires a few steps which are moreover guided by certain elements provided for this purpose on the interface and the device.

Thus, in a first phase, (FIGS. 20 and 23), the user approaches the intermediate interface in question to the first part 30 of the attachment wall by tilting same (by a few degrees to several tens of degrees) in order to engage the rounded surfaces 33 and 53 of the respective attachment means 31 and 51. The user is guided in the procedure by the engagement of the pin 54 and the slot 34 (see FIG. 26).

Figure 21:
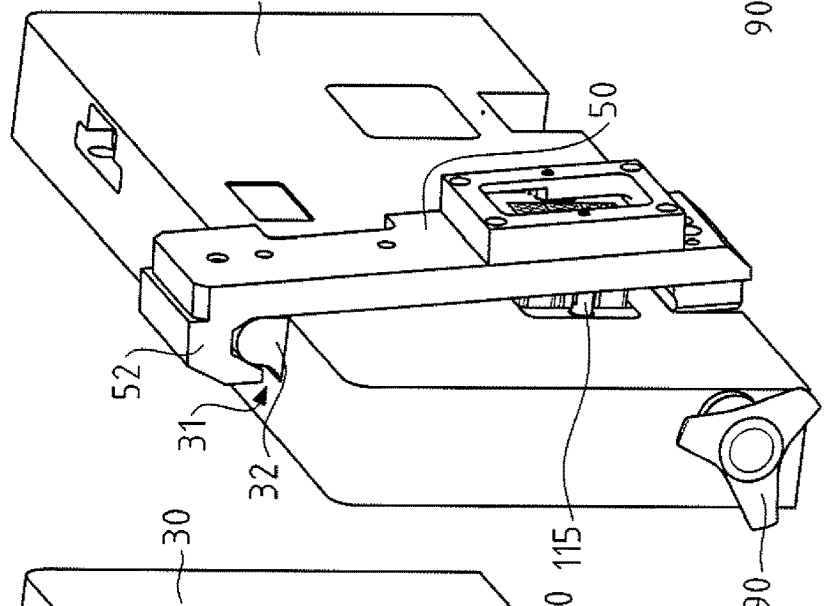
Figure 24:
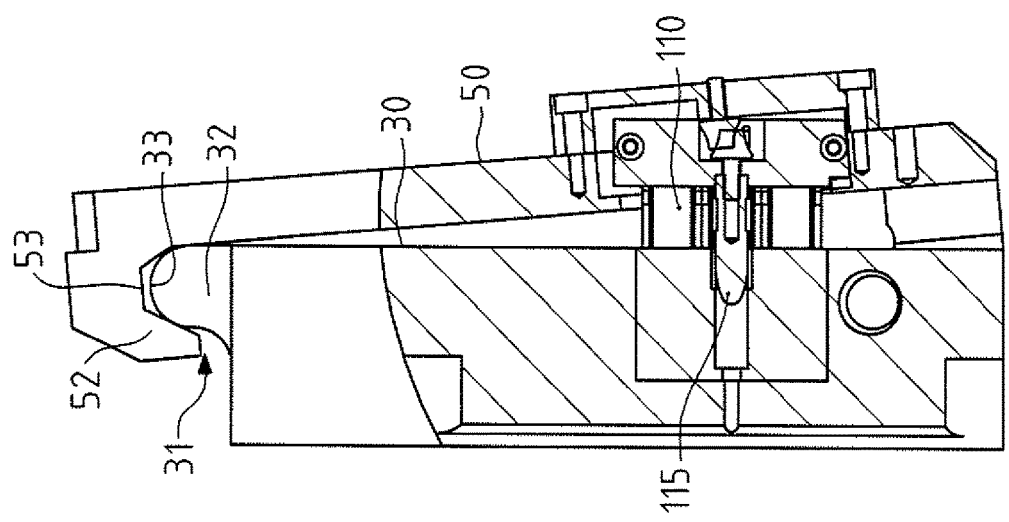

In a second phase (FIGS. 21 and 24), the interface 50 gradually pivots under its own weight and moves closer to the first part 30 of the front wall 20. During this movement, the tappets 115 of the connection modules 100 of the interface 50 are positioned facing the orifices 105 of the connection modules 100 of the first part 30 of the attachment wall 20, whereas the silent blocks 116 assist the pivoting of the connection module 100 of the interface by buckling. This enables the male type Harting connectors 110 of the interface 50 to align with the female type Harting connectors 110 of the first part 30 of the attachment wall.

Figure 22:
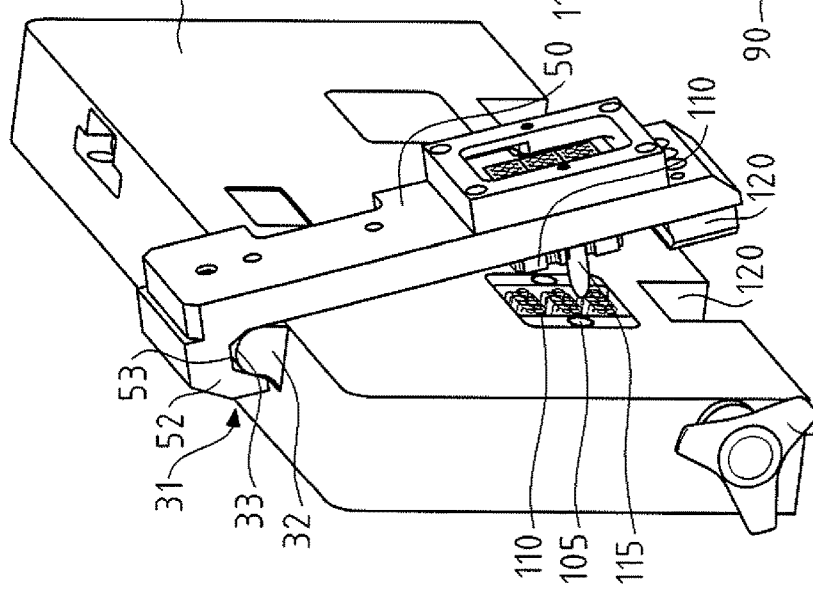
Figure 25:
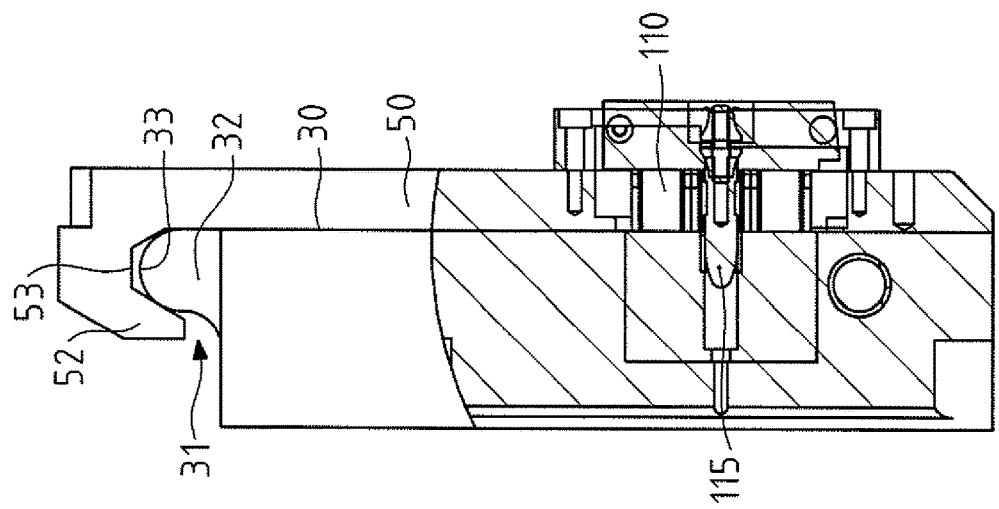

Finally, in a third phase (FIGS. 22 and 25), the intermediate interface 50 continues to move closer to the first part 30 of the attachment wall 20 such that the pins of the Harting connectors 110 and of the pneumatic connectors 120 of the connection modules 100 are connected. This enables the drive members 200 to be controlled via the control panel 7.

The user may then lock the interface installed on the attachment wall 20 using one of the clamping handles 90 provided on the side edge(s) of each part 30 and 40 of the attachment wall 20. The upstream handle 90 makes it possible to lock an intermediate interface on the first part 30 of the front attachment wall 20 whereas the downstream handle 90 makes it possible to lock an intermediate interface on the second part 40 of the front attachment wall 20.

Figure 20:
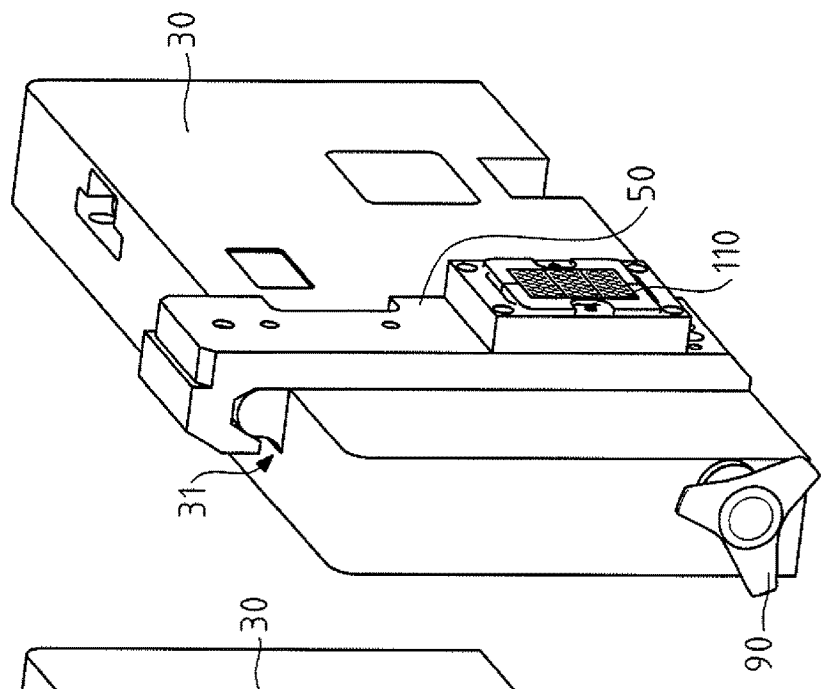
FIGS. 20 to 25 are views showing different steps of attaching an intermediate interface belonging to the device.
Figure 23:
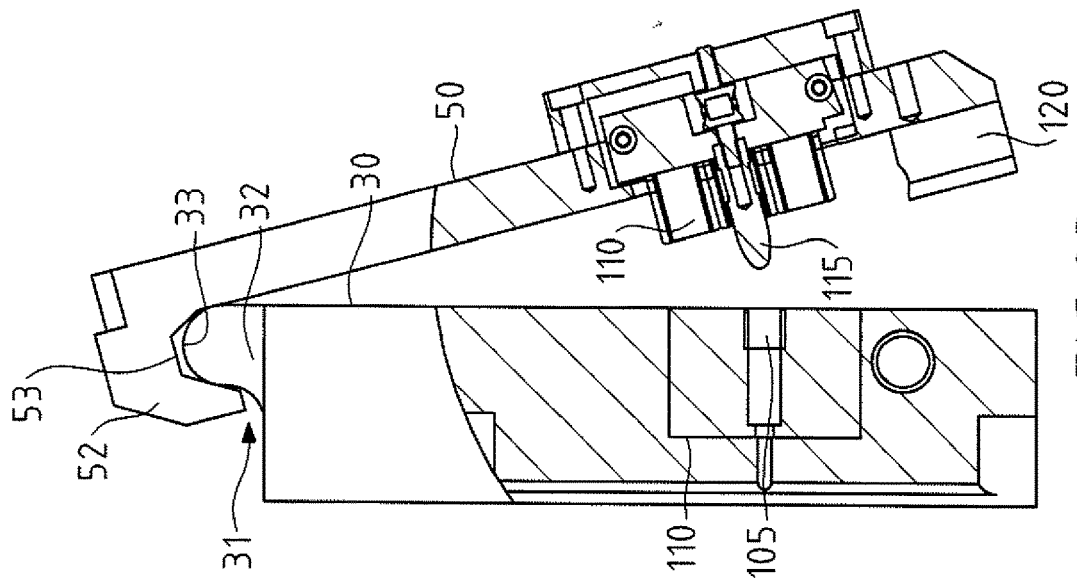
Figure 27:
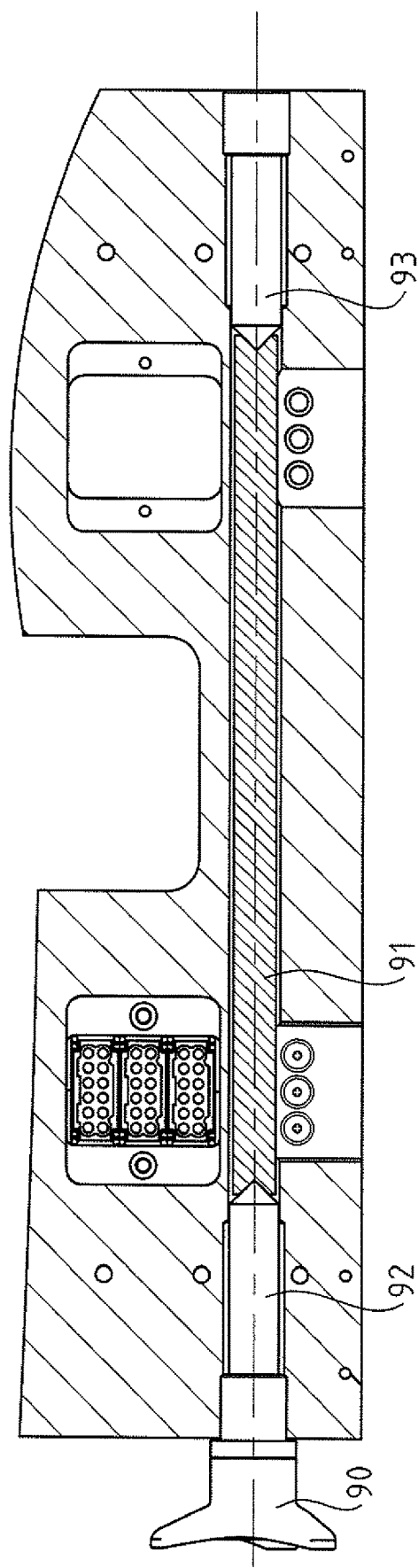
FIG. 27 is a partial longitudinal sectional inside view of FIG. 13.
Figure 28:
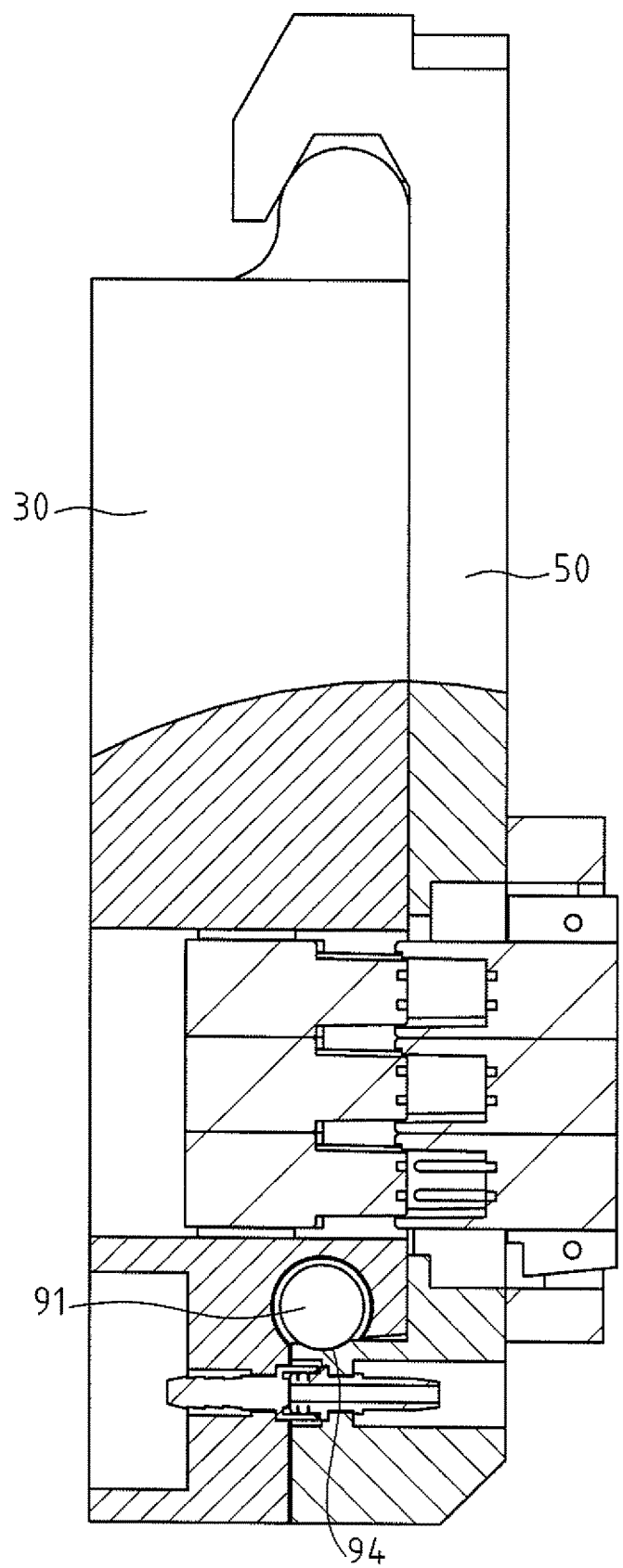
FIG. 28 is a partial transverse sectional inside view of FIG. 13.

As represented in FIGS. 27 and 28, this clamping system schematically comprises a clamping column 91 and mobile and fixed screws 92. When the handle 90 is rotated in the locking direction (clockwise direction preferably), the mobile screw 92 pushes the column 91 towards the fixed screw 93 such that said column 91 centres itself on said screws and is constrained to adopt a locking position where it is naturally housed in a rounded hollow zone 94 of the interface 50 when the latter is correctly positioned (FIGS. 20 and 23). When loosening the clamping handles 90, the column 91 is released and it can then be raised on the passage of the interface.

The interface may use safety elements or sensors, for example limit switches of the actuation cylinders 202, controlled via the Harting connectors 110 of the connection modules 100.

Figure 5:
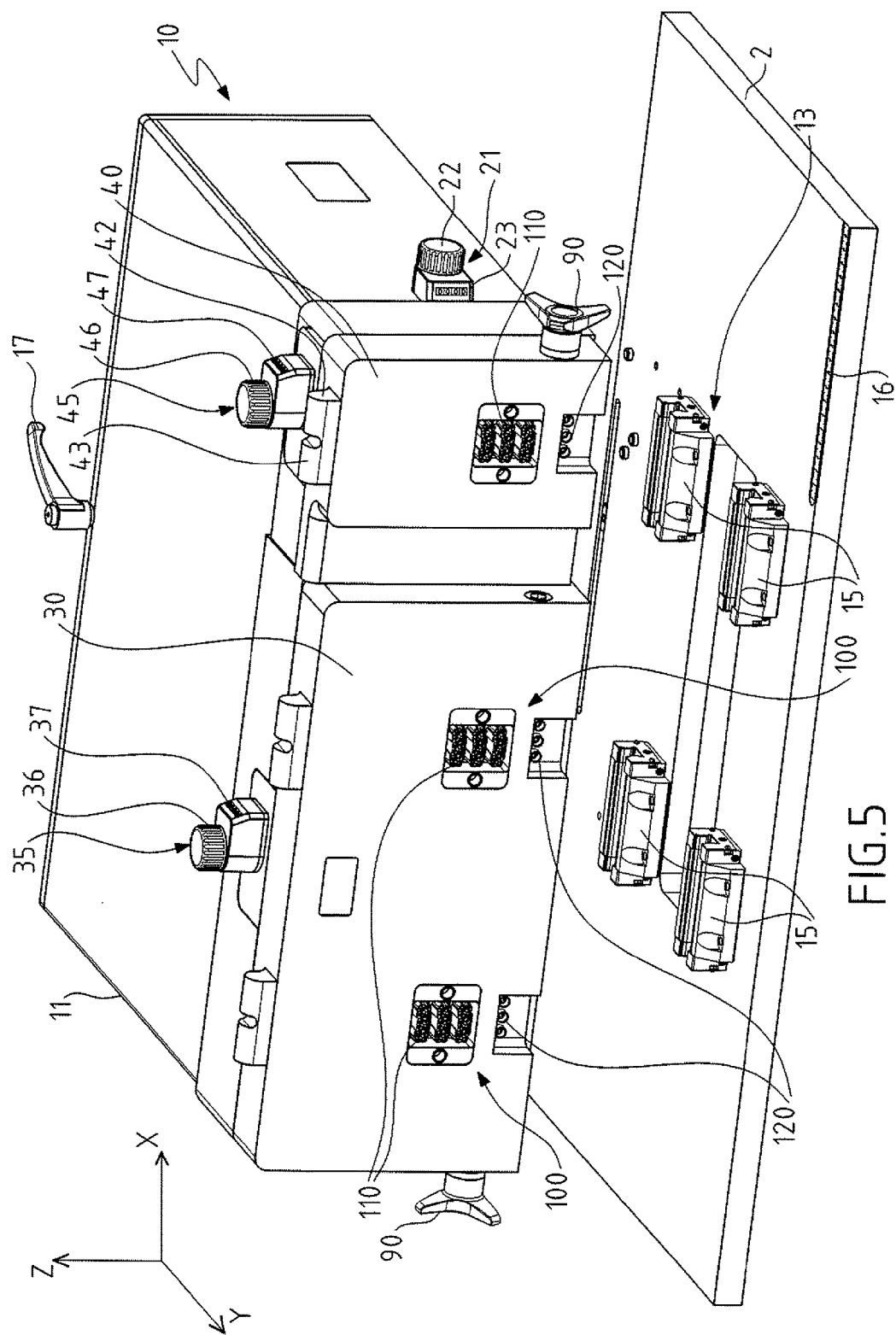
FIG. 5 is an exploded perspective view of a device for dispensing/distributing tablets belonging to the machine in FIG. 1.
Figure 6:
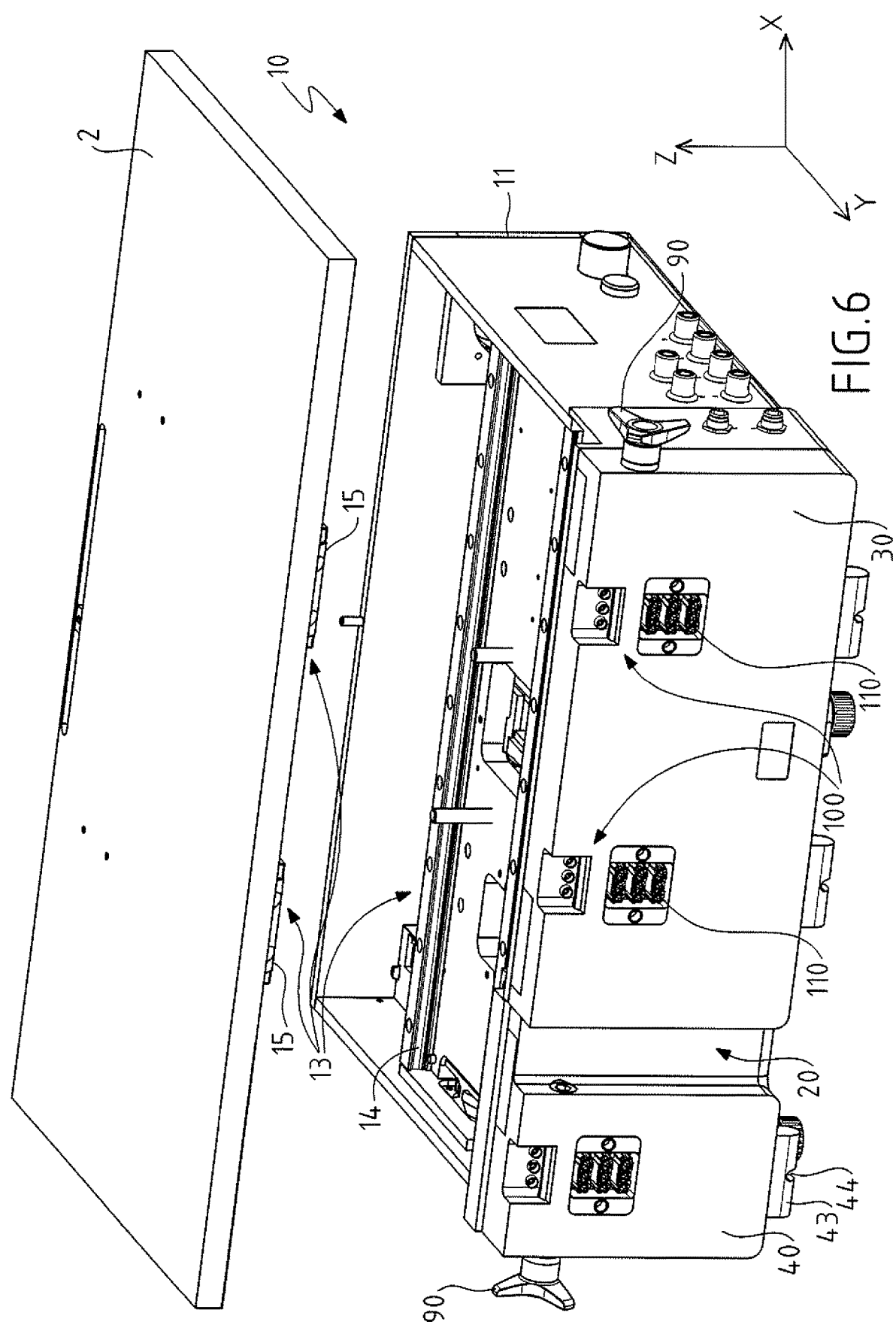
FIG. 6 is a bottom view of FIG. 5.

As seen in FIGS. 5 and 6, the assembly of the frame 11 of the dispensing/distribution device 10 has longitudinal adjustment means 13 of the position thereof along an axis X.

For this, the inside of the frame 11 is provided with two parallel rails 14 whereas the supporting structure 2 comprises two pairs of tracks 15 suitable for sliding longitudinally in the rails 14 as well a rule for measuring the position 16. The linear movement of the frame 11 may be carried out manually or assisted by an auxiliary motorisation. The locking/unlocking of the frame 11 with respect to the supporting structure 2 is performed for example by a rotary handle 17. The movement stroke is for example 200 mm. In the case where the adjustment is motorised, the movement of the device 10 may then be controlled via the control interface 7 and the handle 17 disappears.

Figure 7:
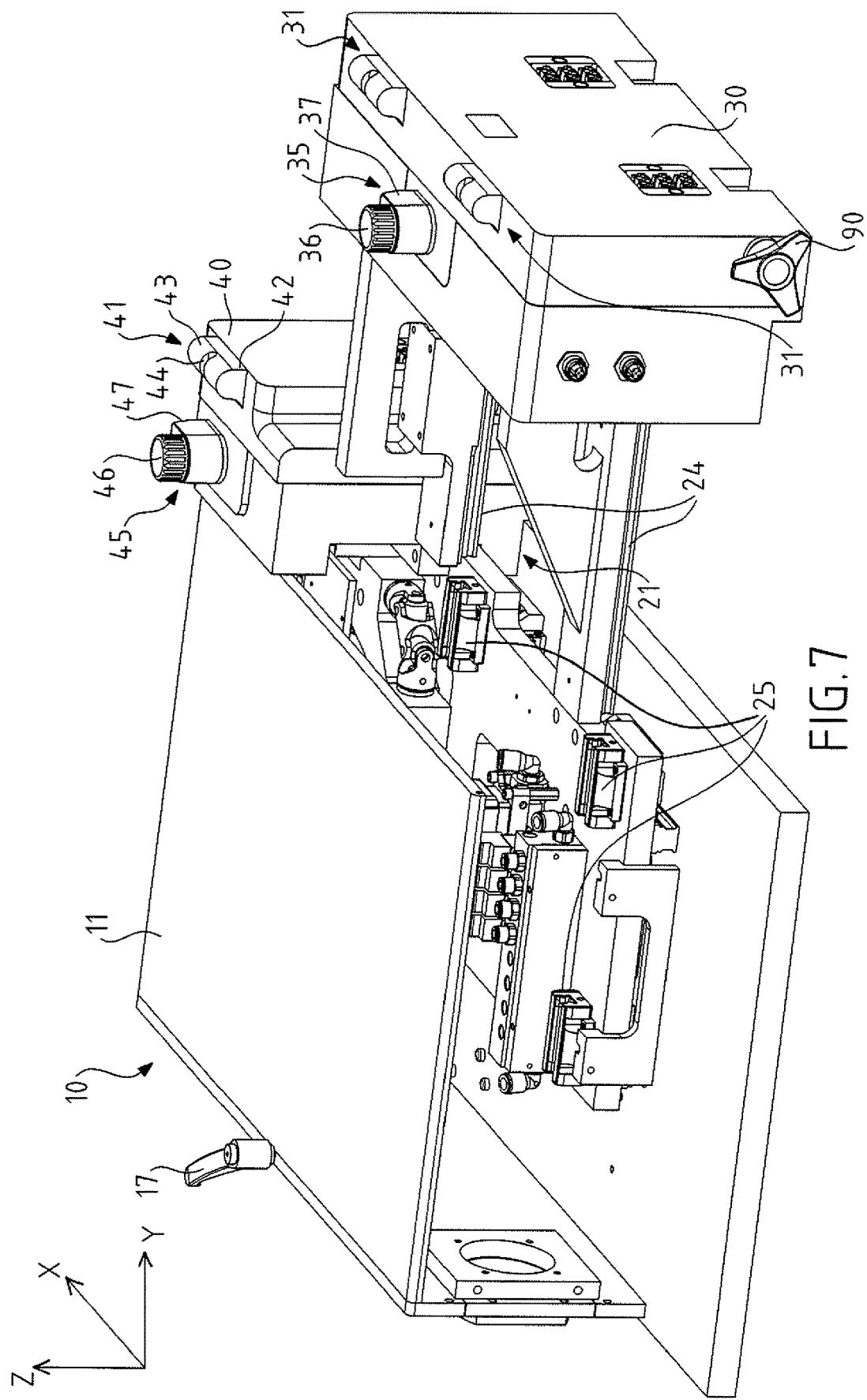
FIG. 7 is an exploded perspective side view of FIG. 5.

In the same way, the first part 30 of the front attachment wall 20 of the frame 11 comprise(s) horizontal depth adjustment means 21 along an axis Y, as illustrated particularly by FIG. 7. More specifically, said horizontal depth adjustment means 21 comprise an operating button 22 (see for example FIGS. 1, 2, 4 and 5) acting upon tracks 24 rigidly connected to said wall part in question and sliding on horizontal guiding rails 25 rigidly connected to the frame 11, as well as a digital movement indicator 23 graduated in tenths of millimetres. The movement stroke along the axis Y is for example 30 mm.

Figure 8:
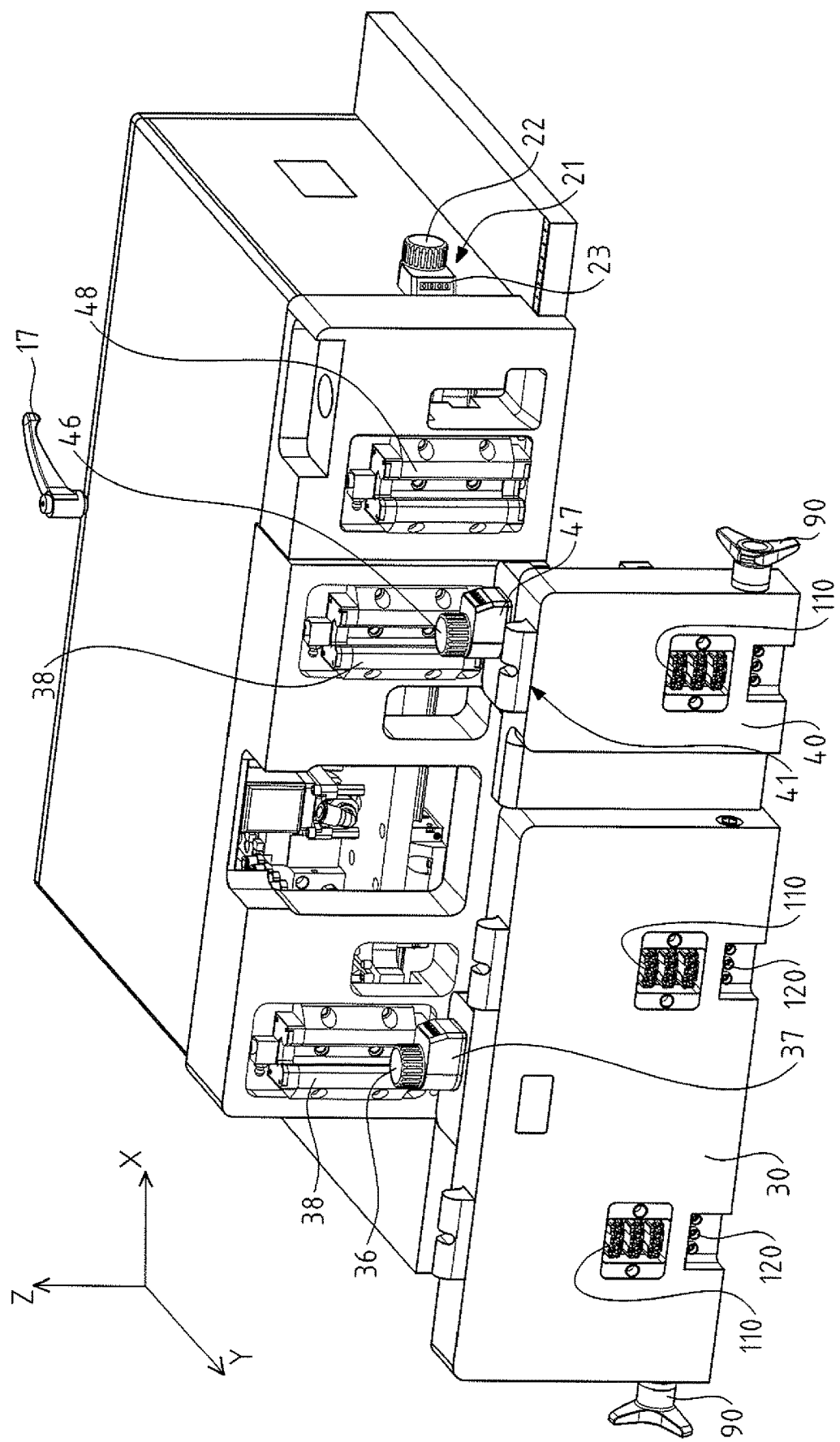
FIG. 8 is a further exploded perspective view substantially similar to FIG. 5.
Figure 9:
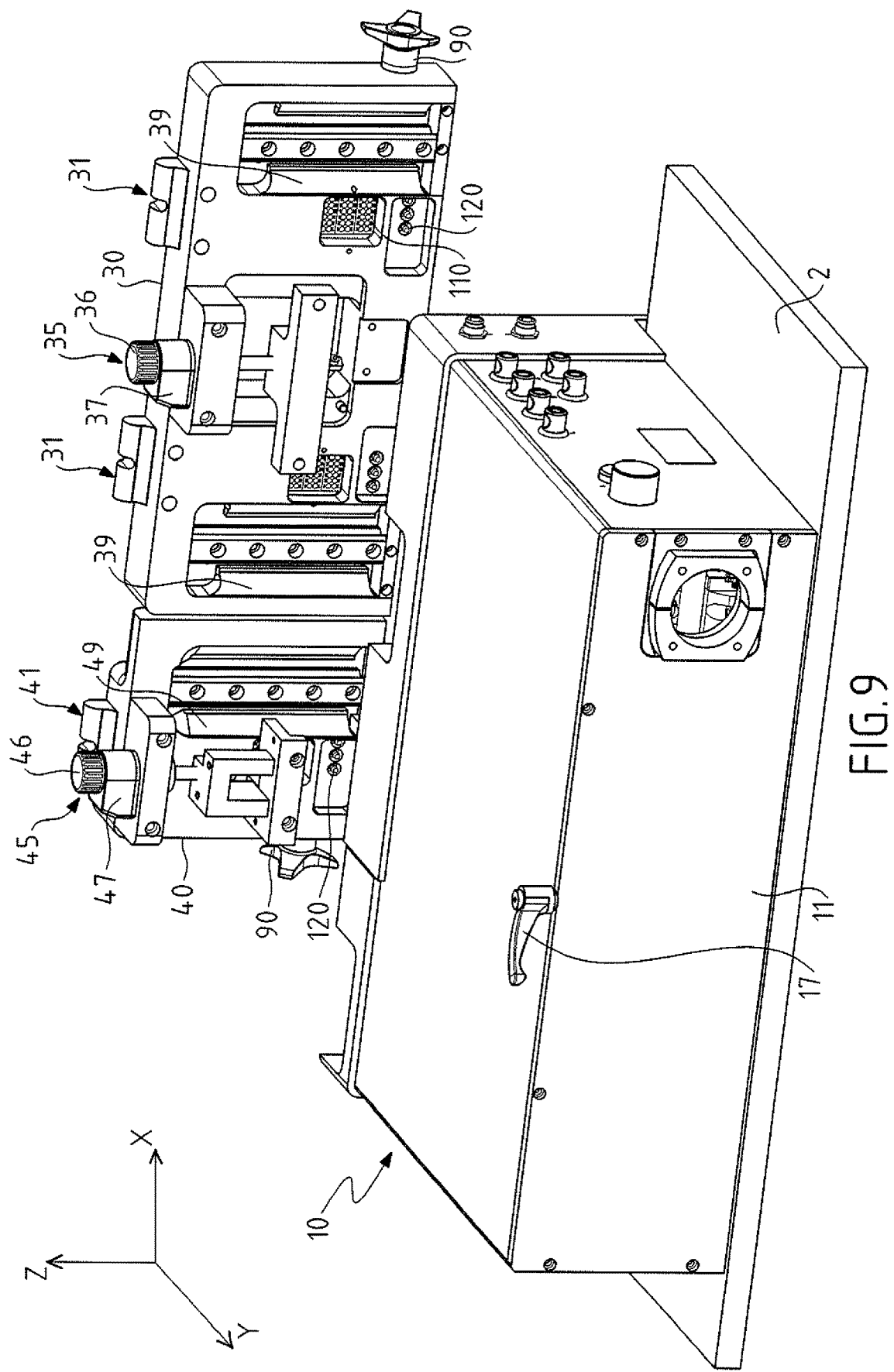
FIG. 9 is a rear view of FIG. 8.

Finally, each part 30 and 40 of the front attachment wall 20 of the frame 11 comprises its own vertical adjustment means along an axis Z, as illustrated in FIGS. 8 and 9.

More specifically, the attachment part 30 comprises vertical adjustment means 35 comprising an operating button 36 acting upon two rails 39 rigidly connected to said attachment part and sliding on two vertical guiding tracks 38 rigidly connected to the frame 11, as well as a digital movement indicator 37 graduated in tenths of millimetres. The movement stroke along the axis Z is for example 30 mm.

Similarly, the attachment part 40 comprises vertical adjustment means 45 comprising an operating button 46 acting upon a rail 49 rigidly connected to said attachment part and sliding on a vertical guiding track 48 rigidly connected to the frame 11, as well as a digital movement indicator 47 graduated in tenths of millimetres. The movement stroke along the axis Z is for example 15 mm.

Advantageously, the various adjustment means 13, 21, 35 and 45 along the axes X, Y and Z may be motorised. In this case, the operating buttons and the associated digital indicator disappear and the movement may then be controlled via the control interface 7.

Moreover, one and/or the other of the attachment parts 30 and 40 of the wall 20 of the frame 11 is/are further equipped with automated vertical movement means alternating in a square cycle between two predetermined positions, independently of the vertical adjustment means 35 and 45.

In the case of the first part 30 of the attachment wall 20, this enhancement may be useful for setting different positions in order to automatically modify the position of the dispensers with respect to the blister-pocketed strip as needed (for example for tube-operated dispensers, the dispenser is raised while the strip travels and is lowered when the tablets are deposited into the blister pockets.

In the case of the second part 40 of the attachment wall 20, the use of a predetermined square cycle may enable the brush for laying the tablets to brush the strip during the stoppage thereof and to be raised again while the strip is travelling.

It is obvious that the detailed description of the subject matter of the Invention, given merely by way of illustration, in no way represents a limitation, the technical equivalents being also within the scope of the present invention.

Thus, the number of connection modules may vary as needed.

Similarly, the second part 40 of the front attachment wall 20 may be adjustable along the axis Y with means similar to the means 21 of the first part 30.

The number of Harting connectors may be less than or greater than the three illustrated in the figures, for example two or four.

The invention claimed is:

1. A reconfigurable device for dispensing or distributing a tablet into a blister pocket of a packing strip subjected to longitudinal movement in a substantially horizontal plane of a packaging machine, the packaging machine having a blister-packer device, the reconfigurable device comprising:
a frame adapted to be mounted on the blister-packer device, said frame having a front attachment wall extending vertically;
at least one accessory adapted to dispense or distribute the tablet in the blister pocket of the packing strip, said at least one accessory selected from the group consisting of a rotary brush box, a fixed ramp, a vibratory ramp and a tube-operated alternating dispenser, said at least one accessory being removably mounted on said frame; and
an intermediate interface removably attached to said frame against the front attachment wall thereof, said intermediate interface supporting said at least one accessory, said at least one accessory having at least one drive member that directly produces a movement of a mobile element of said at least one accessory, wherein said intenı iediate interface is removably attached to said frame without a tool, wherein said intermediate interface has at least one upper hook having a rounded inner surface, wherein the front attachment wall of said frame has at least one associated upper protuberance having a rounded outer surface, each upper hook of the at least one upper hook being suspended above a corresponding upper protuberance of the at least one associated upper protuberance such that the rounded inner surface of the at least one upper hook molds to the rounded outer surface of the at least one associated upper protuberance.

2. The reconfigurable device of claim 1, wherein each upper hook of the at least one upper hook has a guiding pin engaged with a groove formed in the corresponding at least one associated upper protuberance.

3. The reconfigurable device of claim 1, wherein said intermediate interface is attached to said frame by a clamping handle disposed laterally on an outer edge of said frame.

4. The reconfigurable device of claim 1, wherein said at least one accessory is removably connected to said intermediate interface by a click-and-lock fastener on a front vertical wall of said intermediate interface.

5. The reconfigurable device of claim 1, wherein said frame is longitudinally adjustable with a longitudinal adjustment device.

6. The reconfigurable device of claim 5, wherein said longitudinal adjustment device comprises a pair of rails rigidly connected to said frame.

7. The reconfigurable device of claim 5, wherein the longitudinal adjustment device is motorized.

8. The reconfigurable device of claim 1, wherein at least one drive member is selected from the group consisting of rotary motors, gear motors and activation cylinders.

9. A packaging machine having the reconfigurable device of claim 1, wherein said at least one accessory is placed above the blister pocket of the package strip.

10. The reconfigurable device of claim 1, further comprising
a touchscreen or a control panel adapted to be mounted to the reconfigurable device or onto a supporting structure of the blister-packer device.

11. A reconfigurable device for dispensing or distributing a tablet into a blister pocket of a packing strip subjected to longitudinal movement in a substantially horizontal plane of a packaging machine, the packaging machine having a blister-packer device, the reconfigurable device comprising:
a frame adapted to be mounted on the blister-packer device, said frame having a front attachment wall extending vertically;
at least one accessory adapted to dispense or distribute the tablet in the blister pocket of the packing strip, said at least one accessory selected from the group consisting of a rotary brush box, a fixed ramp, a vibratory ramp and a tube-operated alternating dispenser, said at least one accessory being removably mounted on said frame; and
an intermediate interface removably attached to said frame against the front attachment wall thereof, said intermediate interface supporting said at least one accessory, said at least one accessory having at least one drive member that directly produces a movement of a mobile element of said at least one accessory, wherein the front attachment wall of said frame is divided into at least two independent attachment parts each being adapted to receive said at least one accessory via a single interface or via a plurality of independent interfaces, wherein said intermediate interface is attached to said frame with a vertical adjustment device.

12. The reconfigurable device of claim 11, wherein the vertical adjustment device comprises:
an operating button acting upon at least one rail rigidly connected to said intermediate interface and slidable along at least one corresponding vertical guiding track rigidly connected to said frame; and
a digital movement indicator cooperative with said operating button, said digital movement indicator being graduated in tenths of millimeters.

13. The reconfigurable device of claim 11, wherein said front attachment wall of said frame has a horizontal depth adjustment device.

14. The reconfigurable device of claim 13, wherein the horizontal depth adjustment device comprises:
an operating button acting upon at least one track and slidable along at least one corresponding horizontal guiding rail rigidly connected to said frame; and
a digital movement indicator cooperative with said operating button, said digital movement indicator being graduated in tenths of millimeters.

15. The reconfigurable device of claim 11, wherein the vertical adjustment device is motorized.

16. The reconfigurable device of claim 11, wherein the vertical adjustment device has automated vertical movement in a square cycle between a pair of predetermined positions.

17. A reconfigurable device for dispensing or distributing a tablet into a blister pocket of a packing strip subjected to longitudinal movement in a substantially horizontal plane of a packaging machine, the packaging machine having a blister-packer device, the reconfigurable device comprising:
a frame adapted to be mounted on the blister-packer device, said frame having a front attachment wall extending vertically;
at least one accessory adapted to dispense or distribute the tablet in the blister pocket of the packing strip, said at least one accessory selected from the group consisting of a rotary brush box, a fixed ramp, a vibratory ramp and a tube-operated alternating dispenser, said at least one accessory being removably mounted on said frame; and an intermediate interface removably attached to said frame against the front attachment wall thereof, said intermediate interface supporting said at least one accessory, said at least one accessory having at least one drive member that directly produces a movement of a mobile element of said at least one accessory, wherein the front attachment wall and said intermediate interface respectively each comprise at least one connection module, the connection module being connected to one another in order to control a drive member disposed inside said intermediate interface, wherein the at least one connection module has male and female Harting connectors and pneumatic connectors and at least one guiding pin engaged with a corresponding orifice so as to align the connection modules during a positioning of said intermediate interface on the front attachment wall.

18. The reconfigurable device of claim 17, wherein the front attachment wall of said frame comprises three female Harting connectors surrounded laterally by a pair of orifices, wherein said intermediate interface comprises the male Harting connectors surrounded laterally by a pair of guiding pins that are insertable into the orifices.

19. The reconfigurable device of claim 17, wherein the at least one connection module of the front attachment wall comprises a plurality of horizontally-aligned connection modules.

20. The reconfigurable device of claim 17, wherein at least one connection module comprises a plurality of silent blocks alignable with each other when said intermediate interface is attached to the front attachment wall.

* * * * *